(12) United States Patent
Lee et al.

(10) Patent No.: US 11,644,983 B2
(45) Date of Patent: May 9, 2023

(54) STORAGE DEVICE HAVING ENCRYPTION

(71) Applicant: Samsung Electronics Co., Ltd., Suwon-si (KR)

(72) Inventors: Myeong Jong Lee, Seoul (KR); Hyun Sook Hong, Hwaseong-si (KR); Ji Soo Kim, Seongnam-si (KR); Seung-Jae Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/514,059

(22) Filed: Oct. 29, 2021

(65) Prior Publication Data
US 2022/0283714 A1 Sep. 8, 2022

(30) Foreign Application Priority Data

Mar. 3, 2021 (KR) .......................... 10-2021-0028064

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 6,947,556 B1 * | 9/2005 | Matyas, Jr | H04L 9/3213 380/43 |
| 8,509,448 B2 | 8/2013 | Thomas et al. | |
| 8,789,137 B2 | 7/2014 | Yamasaki | |
| 9,026,805 B2 | 5/2015 | Acar et al. | |
| 9,426,147 B2 | 8/2016 | Smith et al. | |
| 9,705,854 B2 | 7/2017 | Khazan et al. | |
| 9,953,168 B1 * | 4/2018 | Lango | H04L 9/3268 |
| 10,693,641 B2 | 6/2020 | Adams et al. | |
| 2015/0318987 A1 * | 11/2015 | Kremp | H04L 9/0822 380/281 |
| 2017/0372085 A1 * | 12/2017 | Howe | H04L 9/0897 |
| 2019/0266103 A1 * | 8/2019 | Pearson | G06F 3/0661 |
| 2020/0067701 A1 * | 2/2020 | Abadir | G06F 21/602 |
| 2020/0145215 A1 * | 5/2020 | McMahon | H04L 9/0894 |

(Continued)

FOREIGN PATENT DOCUMENTS

| | | |
|---|---|---|
| CN | 110071799 A | 7/2019 |
| CN | 111464301 A | 7/2020 |

*Primary Examiner* — Edward J Dudek, Jr.
*Assistant Examiner* — Ralph A Verderamo, III
(74) *Attorney, Agent, or Firm* — Muir Patent Law, PLLC

(57) ABSTRACT

A storage device includes a non-volatile memory configured to store an encryption key and a data key encrypted with the encryption key, writes data using the data key, and reads the data using the data key; and a storage controller, wherein the storage controller is configured to receive a first security setting command which allows access to the data key, using a first password, generates a first key on the basis of the first password in response to the first security setting command, encrypts the encryption key with the first key to generate a first encrypted encryption key, encrypts the first key with the encryption key to generate an encrypted first key, and stores the first encrypted encryption key and the encrypted first key in the non-volatile memory.

20 Claims, 21 Drawing Sheets

CMD_1

| Word | Content | |
|---|---|---|
| 0 | Control word<br>Bit 0     Identifier     0=set User password<br>                                      1=set Master password<br>Bit 1-7   Reserved<br>Bit 8     Security level   0=High<br>                                     1=Maximum<br>Bit 9-15 Reserved | |
| 1-16 | Password (32 bytes) | |
| 17 | Master Password Revision Code (Valid if 0 bit 0=1) | |
| 18-255 | Reserved | |

(56) References Cited

U.S. PATENT DOCUMENTS

| | | |
|---|---|---|
| 2020/0250346 A1 | 8/2020 | Sasidharan et al. |
| 2020/0356285 A1* | 11/2020 | Pan ...................... G06F 3/0658 |
| 2021/0103653 A1* | 4/2021 | Numata ................ G06F 3/0658 |
| 2022/0045850 A1* | 2/2022 | Ejiri .................... G06F 13/1668 |
| 2022/0286282 A1* | 9/2022 | Jeljeli ................... H04L 9/0822 |

* cited by examiner

CMD_1

| Word | Content |
|---|---|
| 0 | Control word<br>Bit 0    Identifier    0 = set User password<br>                                          1 = set Master password<br>Bit 1-7  Reserved<br>Bit 8    Security level  0 = High<br>                                             1 = Maximum<br>Bit 9-15  Reserved |
| 1-16 | Password (32 bytes) |
| 17 | Master Password Revision Code (Valid if 0 bit 0 = 1) |
| 18-255 | Reserved |

CMD_2

| Word | Content |
|---|---|
| 0 | Control word<br>Bit 0      Identifier      0=compare User password<br>                                   1=compare Master password<br>Bit 1-15    Reserved |
| 1-16 | Password (32 bytes) |
| 17-255 | Reserved |

CMD_2'

| Word | Content |
|---|---|
| 0 | Control word<br>Bit 0     Identifier     0=compare User password<br>                                  1=compare Master password<br>Bit 1     Erase mode     0=Normal erase<br>                                  1=Enhanced erase<br>Bit 2-15   Reserved |
| 1-16 | Password (32 bytes) |
| 17-255 | Reserved |

FIG. 15

CMD_3

| Word | Content |
|---|---|
| 0 | Control word<br>Bit 0　　　Identifier　　　0=set User password<br>　　　　　　　　　　　　　　1=set Master password<br>Bit 1-7　　Reserved<br>Bit 8　　　Security level　0=High<br>　　　　　　　　　　　　　　1=Maximum<br>Bit 9-15　Reserved |
| 1-16 | Password (32 bytes) |
| 17 | Master Password Revision Code (Valid if word 0 bit 0=1) |
| 18-255 | Reserved |

S320

S420

STORAGE DEVICE HAVING ENCRYPTION

This application claims priority to Korean Patent Application No. 10-2021-0028064 filed on Mar. 3, 2021 in the Korean Intellectual Property Office, the disclosure of which is herein incorporated by reference in its entirety.

BACKGROUND

1. Field of the Disclosure

The present disclosure relates to a storage device.

2. Description of the Related Art

A storage device is a device that stores data under the control of a host device such as a computer, a smart phone, or a smart pad. The storage device includes a device, such as a hard disk drive (HDD), which stores data on a magnetic disk, or a device, such as a solid state drive (SSD) or a memory card, which stores data in a semiconductor memory, for example a non-volatile memory.

As data security becomes important, a function of encrypting data stored on the storage device is provided. Improving security of storage devices that use encryption is important, as more and more personal information gets stored on these devices.

SUMMARY

Aspects of the present disclosure provide a storage device having upgraded or improved security.

According to some embodiments a storage device includes a non-volatile memory configured to store an encryption key and a data key encrypted with the encryption key, write data using the data key, and read the data using the data key; and a storage controller, wherein the storage controller is configured to receive a first security setting command which allows access to the data key using a first password, generate a first key on the basis of the first password in response to the first security setting command, encrypt the encryption key with the first key to generate a first encrypted encryption key, encrypt the first key with the encryption key to generate an encrypted first key, and store the first encrypted encryption key and the encrypted first key in the non-volatile memory.

According to some embodiments a storage device includes a non-volatile memory configured to store an encrypted first key generated by encrypting a first key generated on the basis of a first password with an encryption key, a first encrypted encryption key generated by encrypting the encryption key with the first key, and an encrypted data key generated by encrypting the data key with the encryption key; and a storage controller configured to control an operation of the non-volatile memory, wherein the storage controller is configured to receive a first security setting command which blocks access to the data key, using the first password, delete the first encrypted encryption key stored in the non-volatile memory in response to the first security setting command, receive a second security setting command which allows access to the data key, using the first password, and store the first encrypted encryption key in the non-volatile memory in response to the second security setting command.

According to some embodiments a storage device includes a non-volatile memory configured to store a first encryption key and a first encrypted data key encrypted with the first encryption key, write data using the data key, and read the data using the data key; and a storage controller, wherein the storage controller is configured to receive a first security setting command that allows access to the data key, using a plurality of first passwords different from each other, generate a plurality of first keys on the basis of each of the plurality of first passwords in response to the first security setting command, encrypt the first encryption key with each of the plurality of first keys to generate a plurality of first encrypted encryption keys, encrypt each of the plurality of first keys with the first encryption key to generate a plurality of encrypted first keys, and store the plurality of first encrypted encryption keys and the plurality of encrypted first keys in the non-volatile memory.

However, aspects of the present disclosure are not restricted to the ones set forth herein. These and other aspects of the present disclosure will become more apparent to one of ordinary skill in the art to which the present disclosure pertains by referencing the detailed description of the present disclosure given below.

BRIEF DESCRIPTION OF THE DRAWINGS

FIGS. 9 to 13 are diagrams for explaining the operation of the storage device according to some embodiments;

FIGS. 14 to 17 are diagrams for explaining the operation of the storage device according to some embodiments;

DETAILED DESCRIPTION OF THE EMBODIMENTS

Figure 1:
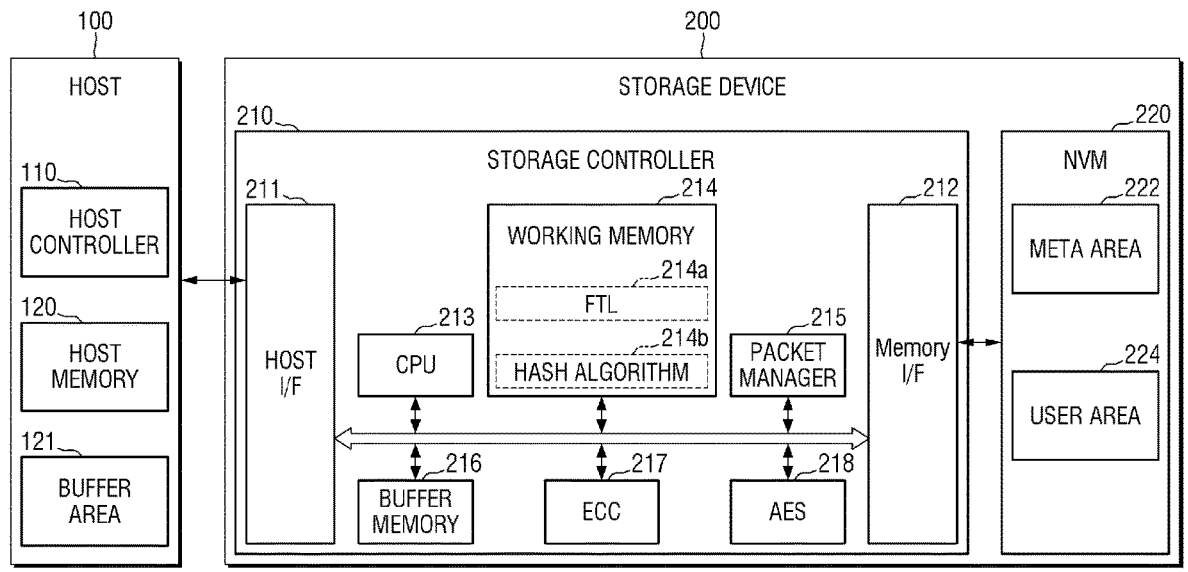
FIG. 1 is a diagram for explaining a storage system according to some embodiments.
Figure 2:
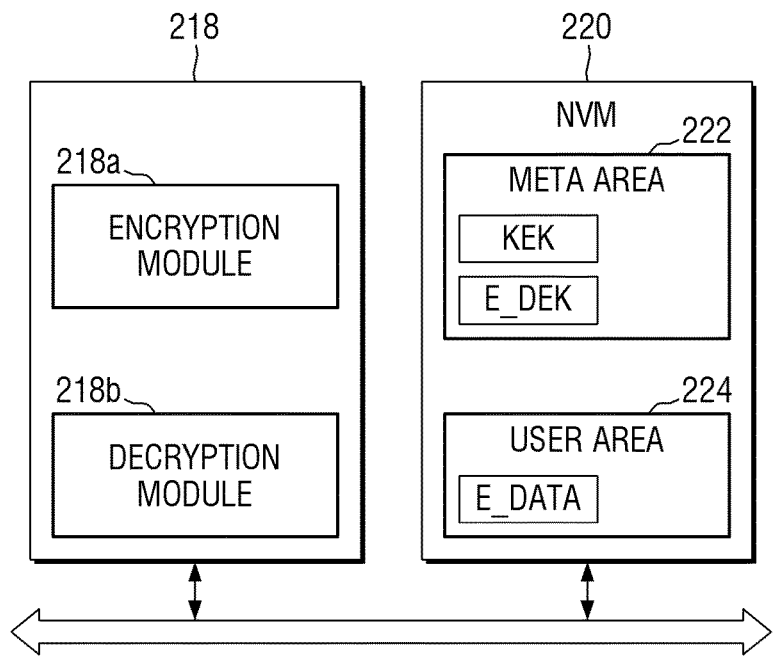
FIG. 2 is a diagram for explaining an AES engine of FIG. 1, according to some embodiments.

FIG. 1 is a diagram for explaining a storage system according to some embodiments. FIG. 2 is a diagram for explaining an AES engine of FIG. 1.

Referring to FIGS. 1 and 2, a storage system 1 may include a host 100 and a storage device 200. The storage device 200 may include a storage controller 210 and a non-volatile memory (NVM) 220. According to exemplary embodiments of the disclosure, the host 100 may include a host controller 110 and a host memory 120. The host memory 120 may function as a buffer memory for temporarily storing data to be transmitted to the storage device 200 or data transmitted from the storage device 200.

The storage device 200 may include a storage medium for storing the data in response to a request from the host 100. As an example, the storage device 200 may include at least one of an SSD (Solid State Drive), an embedded memory, and a detachable external memory. When the storage device 200 is an SSD, the storage device 200 may be a device that complies with an NVMe (non-volatile memory express) standard. When the storage device 200 is an embedded memory or an external memory, the storage device 200 may be a device that complies with UFS (universal flash storage)

or eMMC (embedded multi-media card) standard. The host 100 and the storage device 200 may each generate and transmit packets according to the adopted standard protocol.

When the non-volatile memory 220 of the storage device 200 includes a flash memory, the flash memory may include a 2D NAND memory array or a 3D (or vertical) NAND (VNAND) memory array. As another example, the storage device 200 may also include various other types of non-volatile memories. For example, an MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM) and various other types of memory may be applied as the storage device 200.

According to an embodiment, the host controller 110 and the host memory 120 may be implemented as separate semiconductor chips. Alternatively, in some embodiments, the host controller 110 and the host memory 120 may be integrated on the same semiconductor chip. As an example, the host controller 110 may be one of a plurality of modules provided in an application processor, and the application processor may be implemented as a system on chip (SoC). Further, the host memory 120 may be an embedded memory provided inside the application processor, or a non-volatile memory or a memory module disposed outside the application processor.

The host controller 110 may manage the operation of storing data (for example, recorded data) of a buffer area 121 in the non-volatile memory 220, or storing data (for example, read data) of the non-volatile memory 220 in the buffer area 121.

The storage controller 210 may include a host interface 211, a memory interface 212, and a CPU (central processing unit) 213. Further, the storage controller 210 may further include a working memory 214, a packet manager 215, a buffer memory 216, an ECC (error correction code) 217 engine, and an AES (advanced encryption standard) engine 218. The engines, controllers, modules, and managers described herein may be implemented using hardware, hardware and firmware, or a combination of hardware and software with optional firmware, programmed and/or configured to perform the functions described herein.

The host interface 211 may transmit and receive packets to and from the host 100. Packets transmitted from the host 100 to the host interface 211 may include commands or data to be recorded in the non-volatile memory 220, and packets transmitted from the host interface 211 to the host 100 may include a response to the commands, data read from the non-volatile memory 220, and the like. The memory interface 212 may transmit the data to be recorded in the non-volatile memory 220 to the non-volatile memory 220 or receive the data read from the non-volatile memory 220. Such a memory interface 212 may be implemented to comply with standard protocols such as Toggle or ONFI, for example.

The working memory 214 operates under the control of the CPU 213, and may be used as an operating memory, a buffer memory, a cache memory, or the like. For example, the working memory 214 may be implemented as a volatile memory such as a DRAM and a SRAM or a non-volatile memory such as a PRAM or a flash memory.

A flash translation layer 214a may be loaded into the working memory 214. When the CPU 213 executes the flash translation layer 214a, the data recording and reading operations of the non-volatile memory 220 may be controlled. The flash translation layer 214a may perform various functions such as address mapping, wear-leveling, and garbage collection. The address mapping operation is an operation of changing a logical address received from the host into a physical address which is used for actually storing the data in the nonvolatile memory 220. The wear-leveling is a technique for ensuring that the blocks in the nonvolatile memory 220 are used uniformly to prevent an excessive degradation of a particular block, and may be implemented, for example, through a firmware technique for balancing the erasure counts of the physical blocks. The garbage collection is a technique for ensuring an available capacity in the nonvolatile memory 220 through a method of copying valid data of the block to a new block and then erasing the existing block.

A hash algorithm 214b may be implemented as firmware or software, and may be loaded into the working memory 214. Alternatively, unlike that shown, the hash algorithm 214b may also be implemented as hardware. The hash algorithm 214b may generate a hash value of a password provided from the host 100. Known types of hash algorithms may be used to perform the various hash algorithms described herein.

The packet manager 215 may generate a packet according to the protocol of the interface discussed with the host device 100, or may parse various types of information from the packet received from the host device 100. Further, the buffer memory 216 may temporarily store the data to be recorded in the nonvolatile memory 220 or the data to be read from the nonvolatile memory 220. The buffer memory 216 may be configured to be provided inside the storage controller 210, but may be placed outside the storage controller 210.

An ECC engine 217 may perform error detection and correction functions of the read data that is read from the nonvolatile memory 220. More specifically, the ECC engine 217 may generate parity bits on the write data to be written on the nonvolatile memory 220, and the parity bits thus generated may be stored in the nonvolatile memory 220 together with the write data. When reading the data from the nonvolatile memory 220, the ECC engine 217 may correct an error of the read data, using the parity bits that are read from the nonvolatile memory 220 together with the read data, and output the read data with a corrected error.

An AES engine 218 may perform at least one of encryption and decryption operations of the data which is input to the storage controller 210, using a symmetric-key algorithm. The AES engine 218 may encrypt and decrypt data using the AES (advanced encryption standard) algorithm, and may include an encryption module 218a and a decryption module 218b. Although FIG. 2 shows the encryption module 218a and the decryption module 218b implemented as separate modules from each other, unlike this, a single module that may perform both encryption and decryption can also be implemented inside the AES engine 218.

The non-volatile memory 220 may include a meta area 222 and a user area 224. The meta area 222 may be an area in which keys about the security of the storage device 200 are stored. The meta area 222 may store an encryption key KEK, or an encryption key encrypted with another key and a data key E_DEK encrypted with the encryption key KEK. Alternatively, the meta area 222 may store an encryption key encrypted with another key and a data key E_DEK encrypted with the encryption key KEK (e.g., without storing the encryption key KEK). The user area 224 may be an area in which data E_DATA encrypted with the data key is stored.

For example, the AES engine 218 may receive data transmitted from the host 100. The encryption module 218a may generate encrypted data E_DATA by encrypting the data transmitted from the host 100 using the data key. The encrypted data E_DATA is transmitted from the AES engine 218 to the non-volatile memory 220 and may be stored in the user area 224 of the non-volatile memory 220. Known types of AES encryption algorithms may be used for encryption performed by the various AES engines described herein, for example, using a fixed block size of 128 bits and a key size of 128, 192, or 256 bits.

The AES engine 218 may receive the stored encrypted data E_DATA from the non-volatile memory 220. The decryption module 218b may generate data by decrypting the encrypted data E_DATA transmitted from the non-volatile memory 220 with the data key. Data may be transmitted from the AES engine 218 to the host 100.

FIGS. 3 to 8 are diagrams for explaining the operation of the storage device according to some embodiments.

The storage device 200 may be in a state in which a first password MPW (e.g., a master password) is set by a manufacturer.

Figures 3, 4:
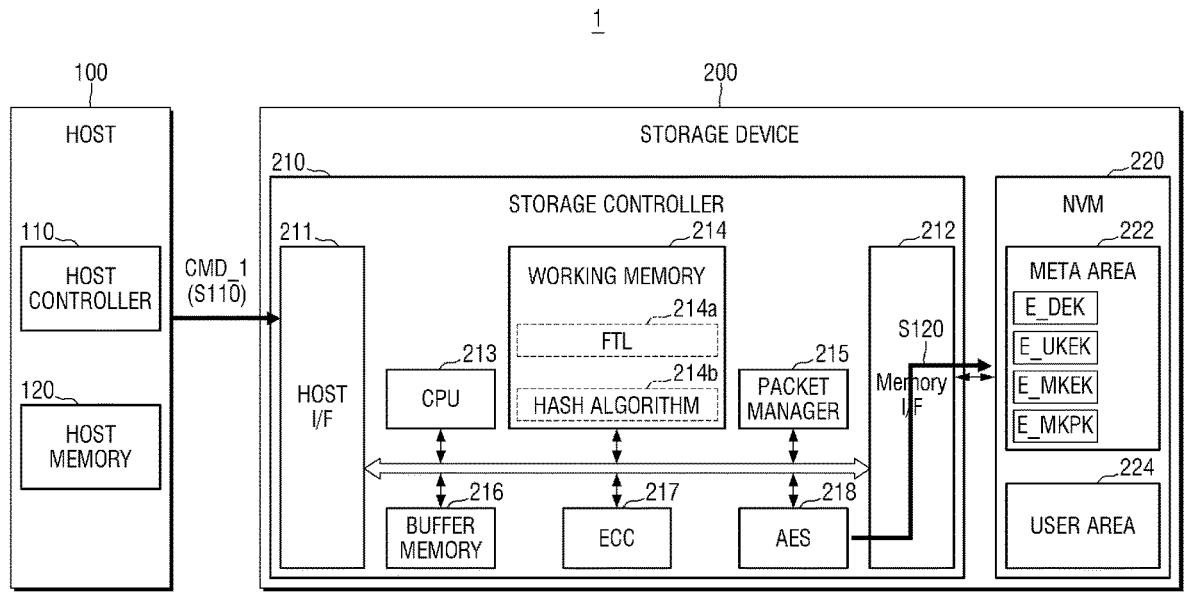
FIGS. 3 to 8 are diagrams for explaining the operation of the storage device according to some embodiments.
Figure 5:
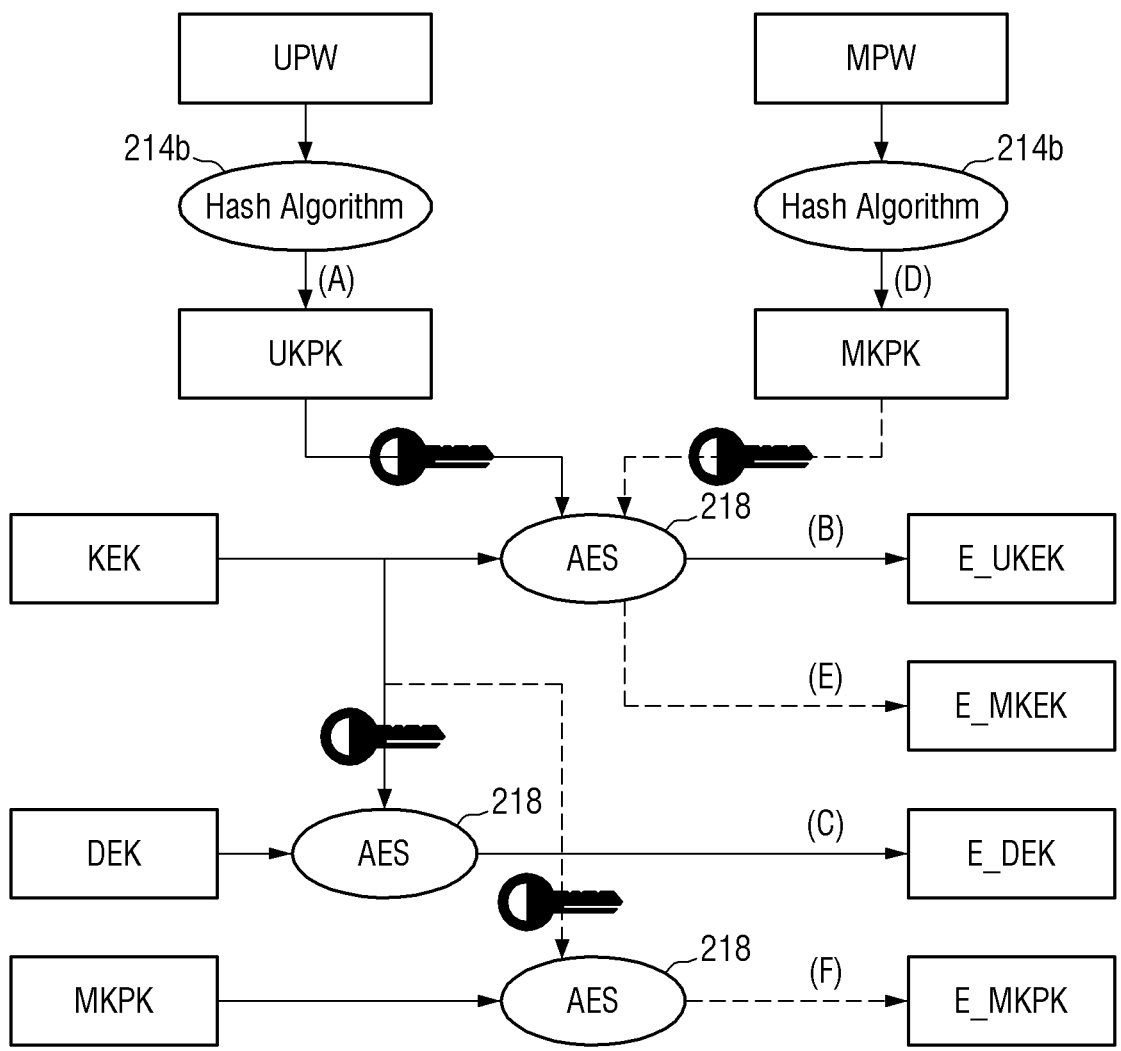

Referring to FIG. 3, the storage device 200 according to some embodiments may receive a security setting command CMD_1 that allows access to the data key DEK, using the first password MPW (S110).

Specifically, the security setting command CMD_1 may include the second password UPW (e.g., a user password) and security authority of the second password UPW. The security authority of the second password UPW may be a first level. Further, the security setting command CMD_1 may include an identification value indicating setting of the second password UPW.

When the security authority of the second password UPW is the first level (High), the storage device 200 may be changed from a lock state to an unlock state by one of the first password MPW or the second password UPW. Accordingly, the host 100 may read the data stored in the storage device 200 or store the data in the storage device 200. When the security authority of the second password UPW is a second level, the storage device 200 may be changed from the lock state to the unlock state only by the second password UPW. For example, when the security authority is the second level, the host 100 can change the storage device 200 to the unlock state, using the first password MPW, but is prevented from reading the data stored in the storage device 200 or storing data in the storage device 200 using the first password MPW.

As mentioned above, the storage controller 210 may encrypt the data with the data key DEK to store the encrypted data E_DATA in the non-volatile memory 220, and may decrypt the encrypted data E_DATA with the data key DEK to read the encrypted data E_DATA stored in the non-volatile memory 220. Therefore, to explain in another way, when the security authority of the second password UPW is the first level, an access to the key DEK may be allowed, using any one of the first password MPW and the second password UPW. When the security authority of the second password UPW is the second level, the access to the data key DEK may be blocked, using the first password MPW, and the access to the data key DEK may be allowed, using the second password UPW.

In some embodiments, the security setting command CMD_1 may be implemented in the form of the SECURITY SET PASSWORD command shown in FIG. 4, in accordance with the ATA (advanced technology attachment) standard. Here, the first security level may be High, and the second security level may be Maximum. Since the detailed configuration of the SECURITY SET PASSWORD command is described in the ATA standard document, detailed description thereof will not be provided.

The storage controller 210 generates a first encrypted encryption key E_MKEK, a second encrypted encryption key E_UKEK, an encrypted first key E_MKPK, and an encrypted second key E_UKPK in response to the security setting command CMD_1, and may store the first encrypted encryption key E_MKEK, the second encrypted encryption key E_UKEK, and the encrypted first key E_MKPK in the meta area 222 of the non-volatile memory 220 (S120).

Specifically, referring to FIGS. 5a and 5b, the hash algorithm 214b may generate a second key UKPK on the basis of the second password UPW (A). The second key UKPK may be a hash value of the second password UPW. The AES engine 218 may encrypt the encryption key KEK with the second key UKPK to generate the second encrypted encryption key E_UKEK (B). The second encrypted encryption key E_UKEK may be stored in the meta area 222 of the non-volatile memory 220. When the encryption key KEK is stored in the meta area 222 of the non-volatile memory 220, the storage controller 210 deletes the encryption key KEK, and may store the second encrypted encryption key E_UKEK.

As mentioned above, the encrypted data key E_DEK may be stored in the meta area 222 of the non-volatile memory 220, and the encrypted data key E_DEK may be generated when the AES engine 218 encrypts the data key DEK with the encryption key KEK (C). An access to the data key DEK may be allowed using the second password UPW accordingly.

The hash algorithm 214b may generate a first key MKPK on the basis of the first password MPW (D). The first key MKPK may be a hash value of the first password MPW. The AES engine 218 may encrypt the encryption key KEK with the first key MKPK to generate the first encrypted encryption key E_MKEK (E). The first encrypted encryption key E_MKEK may be stored in the meta area 222 of the non-volatile memory 220. An access to the data key DEK may be allowed using the first password MPW accordingly.

Further, the AES engine 218 may encrypt the first key MKPK with an encryption key KEK to generate the encrypted first key E_MKPK (F). The encrypted first key E_MKPK may be stored in the meta area 222 of the non-volatile memory 220. As shown in FIGS. 5A and 5B, the first key MKPK may be encrypted with the encryption key KEK, and the encryption key KEK may be encrypted with the first key MKPK. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Figure 6:
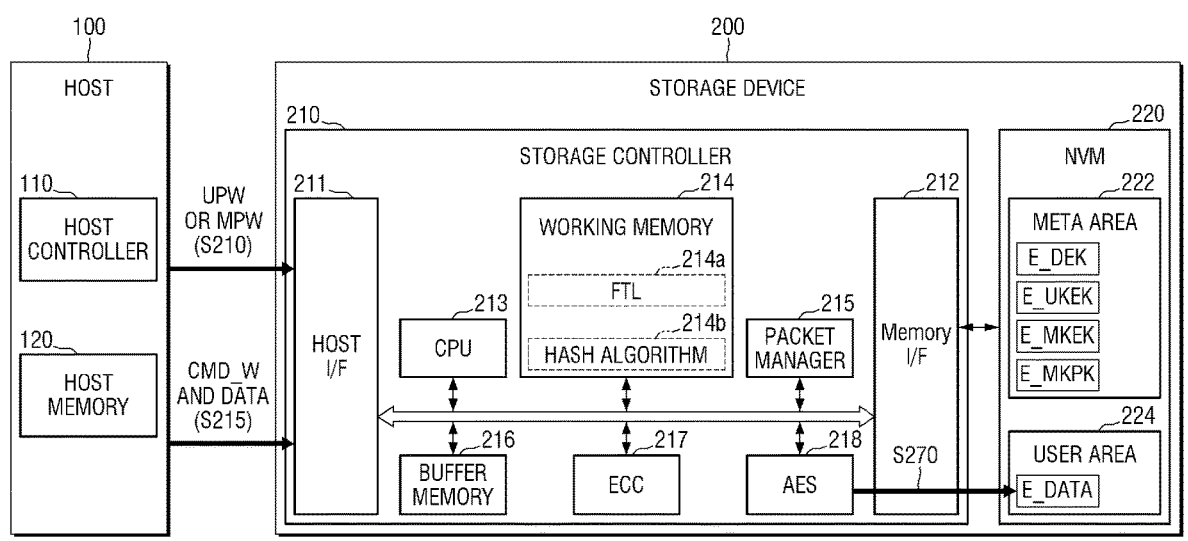
Figure 7:
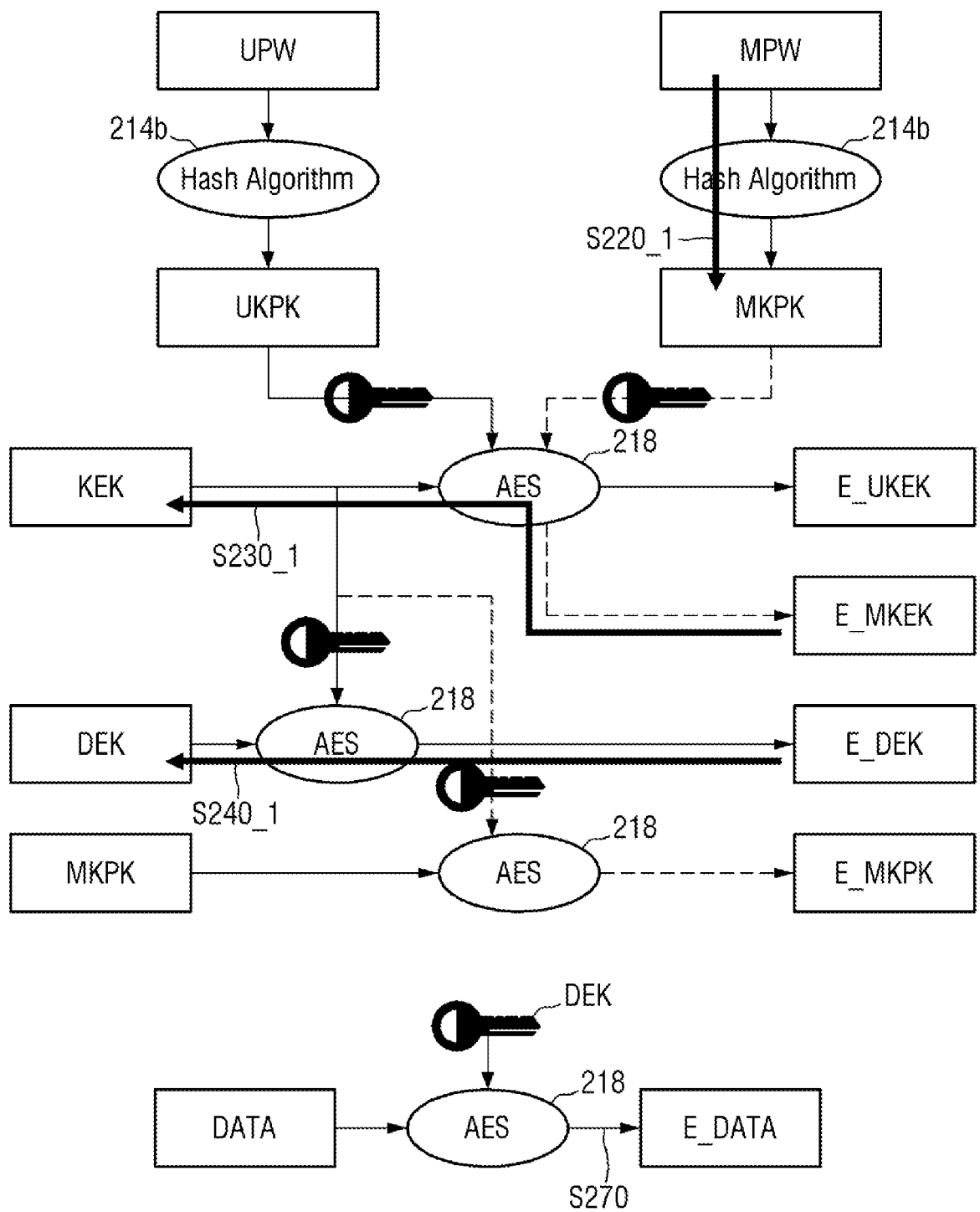
Figure 8:
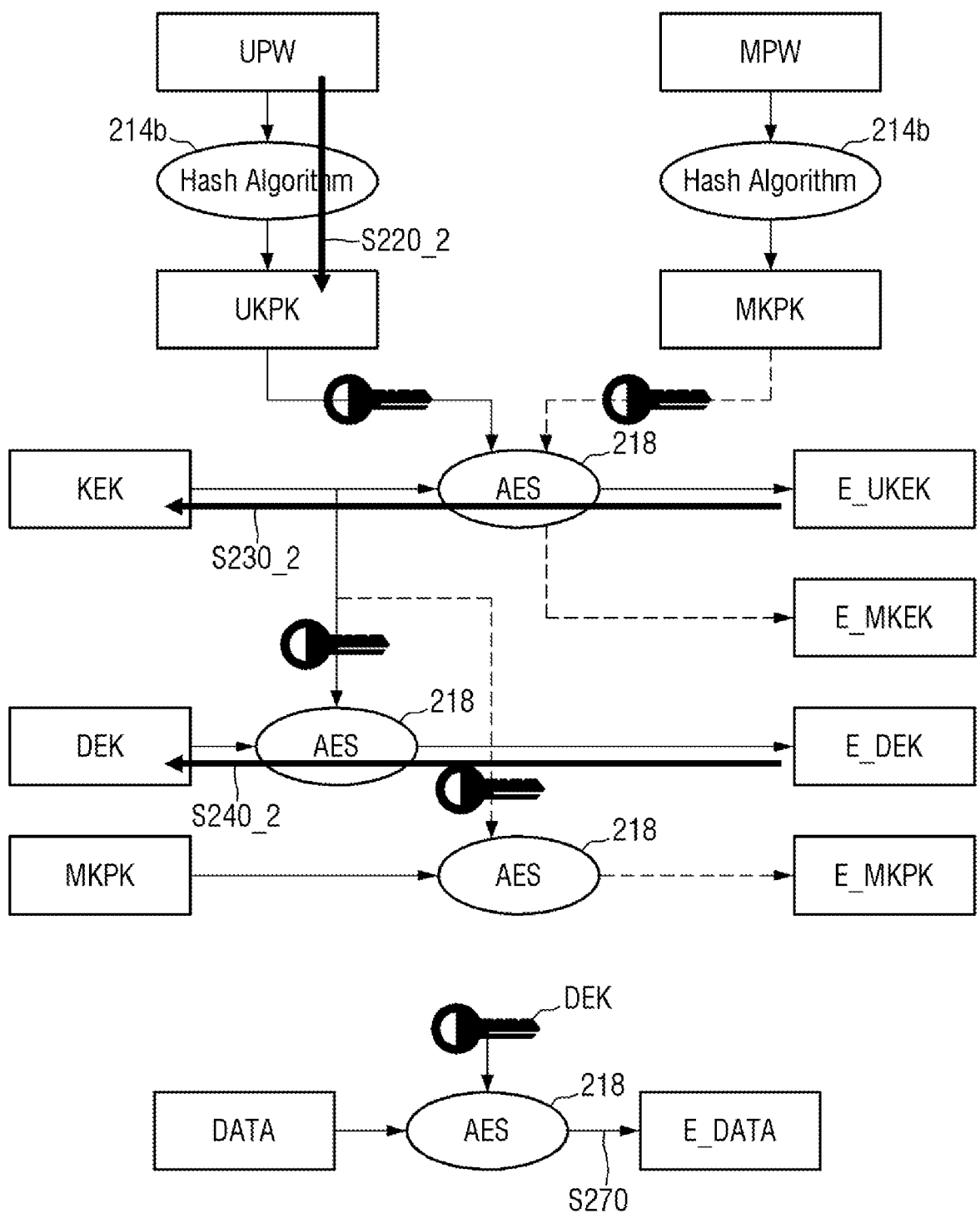

FIGS. 6 to 8 are diagrams for explaining the operation of the storage device after step S120.

Referring to FIGS. 6 and 7, the storage device 200 may receive the first password MPW (S210). Subsequently, the storage device 200 may receive data DATA and a write command CMD_W (S215).

In response to the write command CMD_W, the hash algorithm 214b may generate the first key MKPK on the basis of the first password MPW (S220_1). The AES engine 218 may decrypt the first encrypted encryption key E_MKEK stored in the non-volatile memory 220 with the first key MKPK to generate the encryption key KEK (S230_1). The AES engine 218 may decrypt the encrypted data key E_DEK stored in the non-volatile memory 220 with the encryption key KEK to generate the data key DEK (S240_1). The AES engine 218 may encrypt the data DATA with the encryption key KEK to store the encrypted data E_DATA in the non-volatile memory 220 (S270).

Referring to FIGS. 6 and 8, the storage device 200 may receive the second password UPW (S210). Subsequently, the storage device 200 may receive the data DATA and the write command CMD_W (S215).

In response to the write command CMD_W, the hash algorithm 214b may generate a second key UKPK on the basis of the second password UPW (S220_2). The AES engine 218 may decrypt the second encrypted encryption key E_UKEK stored in the non-volatile memory 220 with the second key UKPK to generate the encryption key KEK. (S230_2). The AES engine 218 may decrypt the encrypted data key E_DEK stored in the non-volatile memory 220 with the encryption key KEK to generate the data key DEK (S240_2). The AES engine 218 may encrypt the data DATA with the encryption key KEK to store the encrypted data E_DATA in the non-volatile memory 220 (S270).

FIGS. 9 to 13 are diagrams for explaining the operation of the storage device according to some embodiments. FIGS. 9 to 13 are diagrams for explaining the operation of the storage device after step S120.

Figures 9, 10:
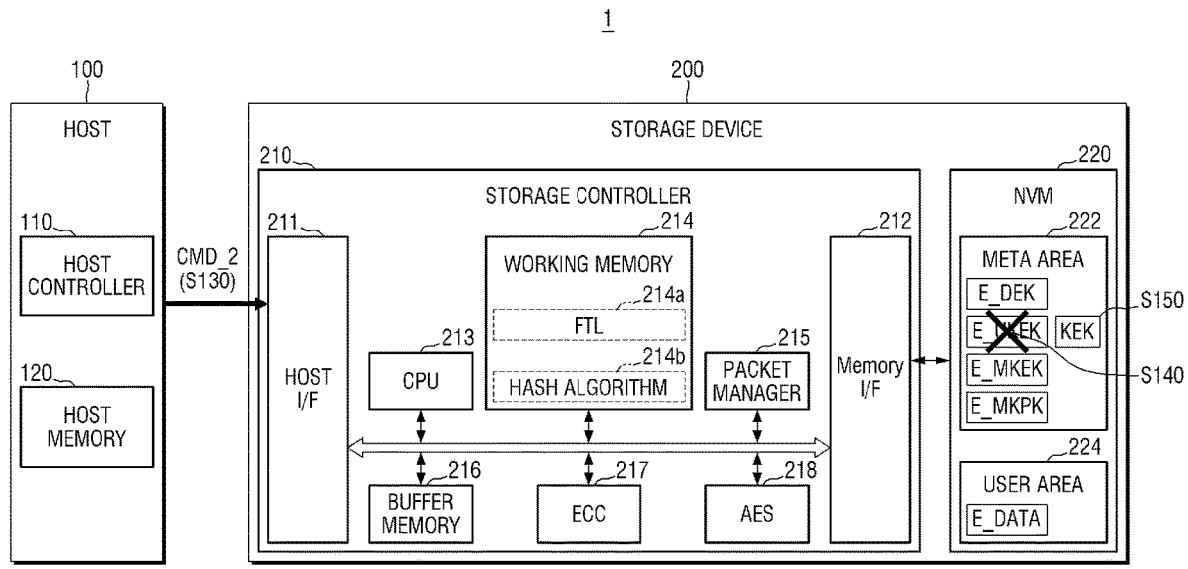
Figure 11:
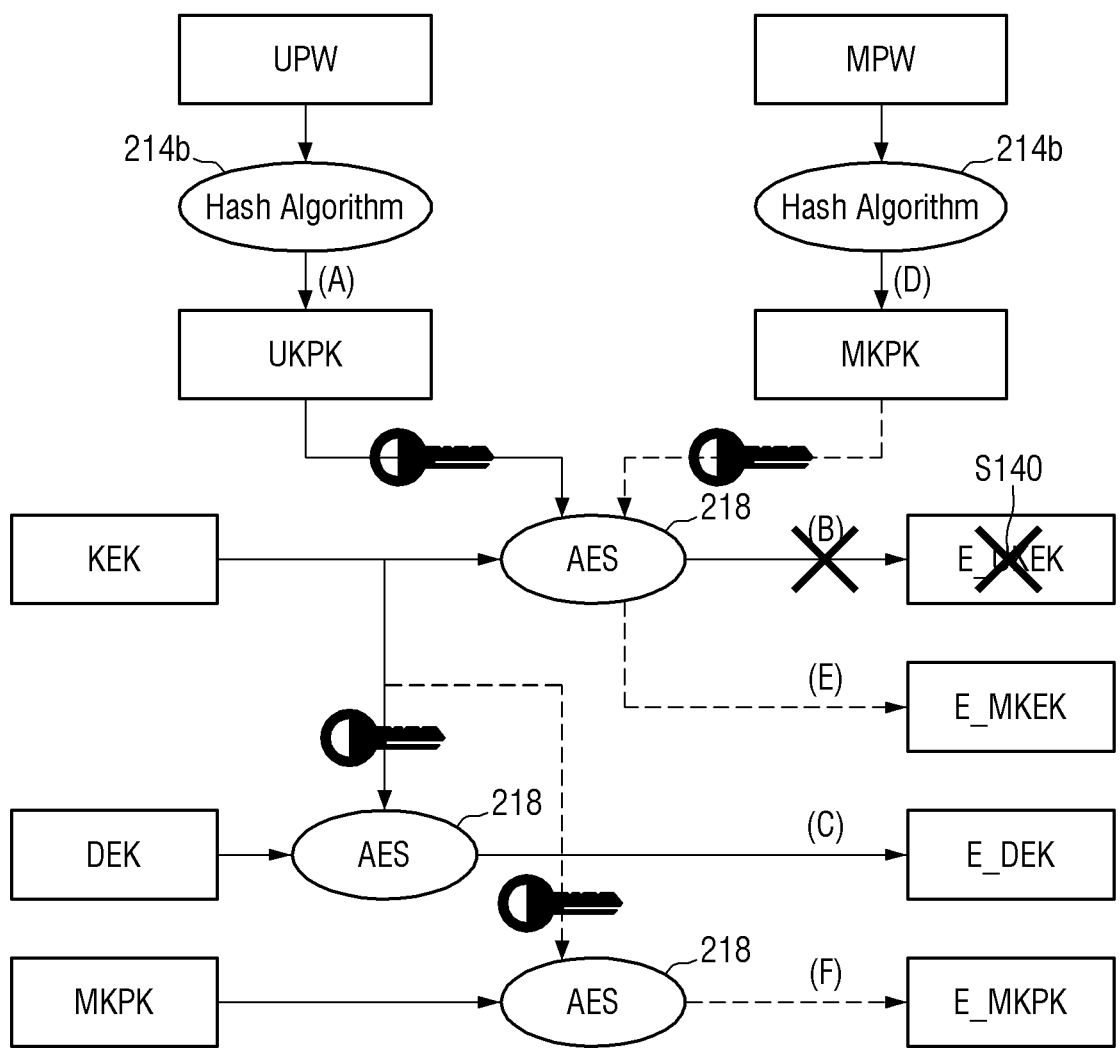

Referring to FIGS. 9 to 11, the storage device 200 according to some embodiments may receive a security release command CMD_2 that allows access to the data key DEK from the host 100, without using the first password MPW or the second password UPW (S130).

The security release command CMD_2 may include any one of the first password MPW and the second password UPW, and a value for identifying whether the first password MPW or the second password UPW is included. The non-volatile memory 220 may store a first value generated on the basis of the first password MPW and a second value generated on the basis of the second password UPW. When the security release command CMD_2 includes the first password MPW, the storage controller 210 may perform the security release operation on the basis of the first password MPW included in the security release command CMD_2 and the first value. When the security release command CMD_2 includes the second password UPW, the storage controller 210 may perform the security release operation on the basis of the second password UPW included in the security release command CMD_2 and the second value.

In some embodiments, the security release command CMD_2, shown in FIG. 9, may be implemented in the form of a SECURITY DISABLE PASSWORD command in accordance with the ATA standard. Since the detailed configuration of the SECURITY DISABLE PASSWORD command is described in the ATA standard documents, detailed description thereof will not be provided.

The storage controller 210 may delete the second encrypted encryption key E_UKEK stored in the meta area 222 of the non-volatile memory 220 in response to the security release command CMD_2 (S140). The access to the data key DEK using the second password UPW may be blocked accordingly. For example, the second password UPW may be disabled or reset such that it is no longer used to access the data key DEK. The first password MPW is not changed.

Also, the storage controller 210 may generate an encryption key KEK and store it in the meta area 222 of the non-volatile memory 220 (S150). In addition, in some embodiments, in response to the security release command CMD_2, after generating and storing the encryption key KEK in the meta area 222, both the first encrypted encryption key E_MKEK and the second encrypted encryption key E_UKEK stored in the meta area 222 of the non-volatile memory 220 may be deleted.

When the security release command CMD_2 includes the first password MPW, the storage controller 210 may generate an encryption key KEK, using the first password MPW and the first encrypted encryption key E_MKEK (e.g., before the first encrypted encryption key E_MKEK is deleted). When the security release command CMD_2 includes the second password UPW, the storage controller 210 may generate the encryption key KEK, using the second password UPW and the second encrypted encryption key E_UKEK (e.g., before the second encrypted encryption key E_UKEK is deleted). Steps S140 and S150 may be performed simultaneously (e.g., if the security release command CMD_2 includes the first password MPW, the second encrypted encryption key E_UKEK can be simultaneously deleted while the encryption key KEK is generated, or if the security release command CMD_2 includes the second password UPW, the first encrypted encryption key E_MKEK can be simultaneously deleted while the encryption key KEK is generated), or one of them may be performed first.

Figure 12:
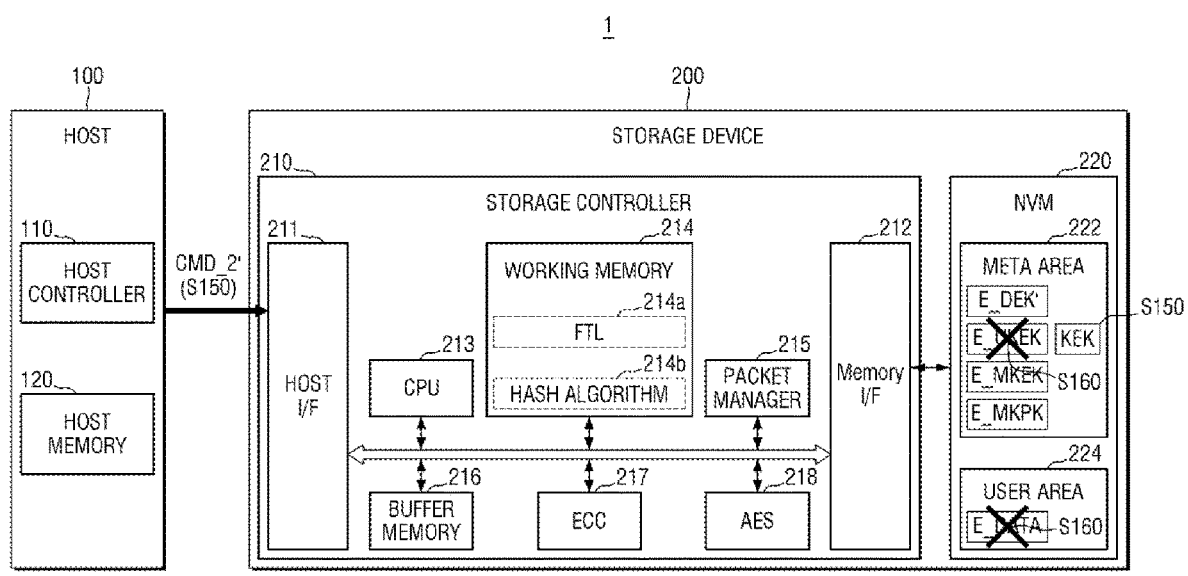
Figures 13, 14:
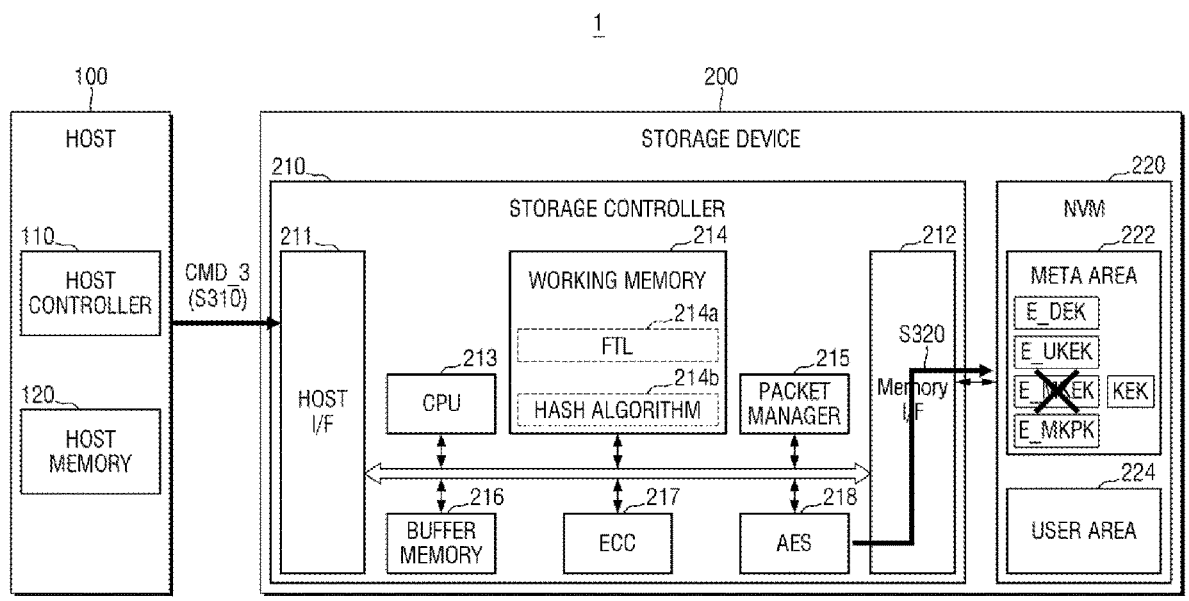

Alternatively, referring to FIGS. 12 and 13, the storage device 200 according to some embodiments may receive a security deletion command CMD_2' for deleting the data E_DATA stored in the non-volatile memory 220 from the host 100 (S150).

The security deletion command CMD_2' may include one of the first password MPW or the second password UPW and a value for identifying whether the first password MPW or the second password UPW is included. When the security deletion command CMD_2' includes the first password MPW, the storage controller 210 may perform the security deletion operation on the basis of the first password MPW and the first value. When the command CMD_2' includes the second password UPW, the storage controller 210 may perform the security deletion operation on the basis of the second password UPW and the second value.

In some embodiments, the security deletion command CMD_2' shown in FIG. 13 may be implemented in the form of the SECURITY ERASE UNIT in accordance with the ATA standard. Since the detailed configuration of the SECURITY ERASE UNIT command is described in the ATA standard documents, detailed description thereof will not be provided.

The storage controller 210 may delete the second encrypted encryption key E_UKEK stored in the meta area 222 of the non-volatile memory 220 and the encrypted data E_DATA stored in the user area 224 of the non-volatile memory 220 in response to the security deletion command CMD_2' (S140). The first password MPW is not changed.

Further, the storage controller 210 may delete the first encrypted encryption key E_MKEK and the encrypted data key E_DEK in response to the security deletion command CMD_2'. The storage controller 210 may generate a new data key, and may store new data key E_DEK' encrypted with the encryption key KEK in the meta area 222 of the non-volatile memory 220.

FIGS. 14 to 17 are diagrams for explaining the operation of the storage device according to some embodiments. FIGS. 14 to 17 are diagrams for explaining the operation of the storage device after step S140 or S160.

Figure 16:
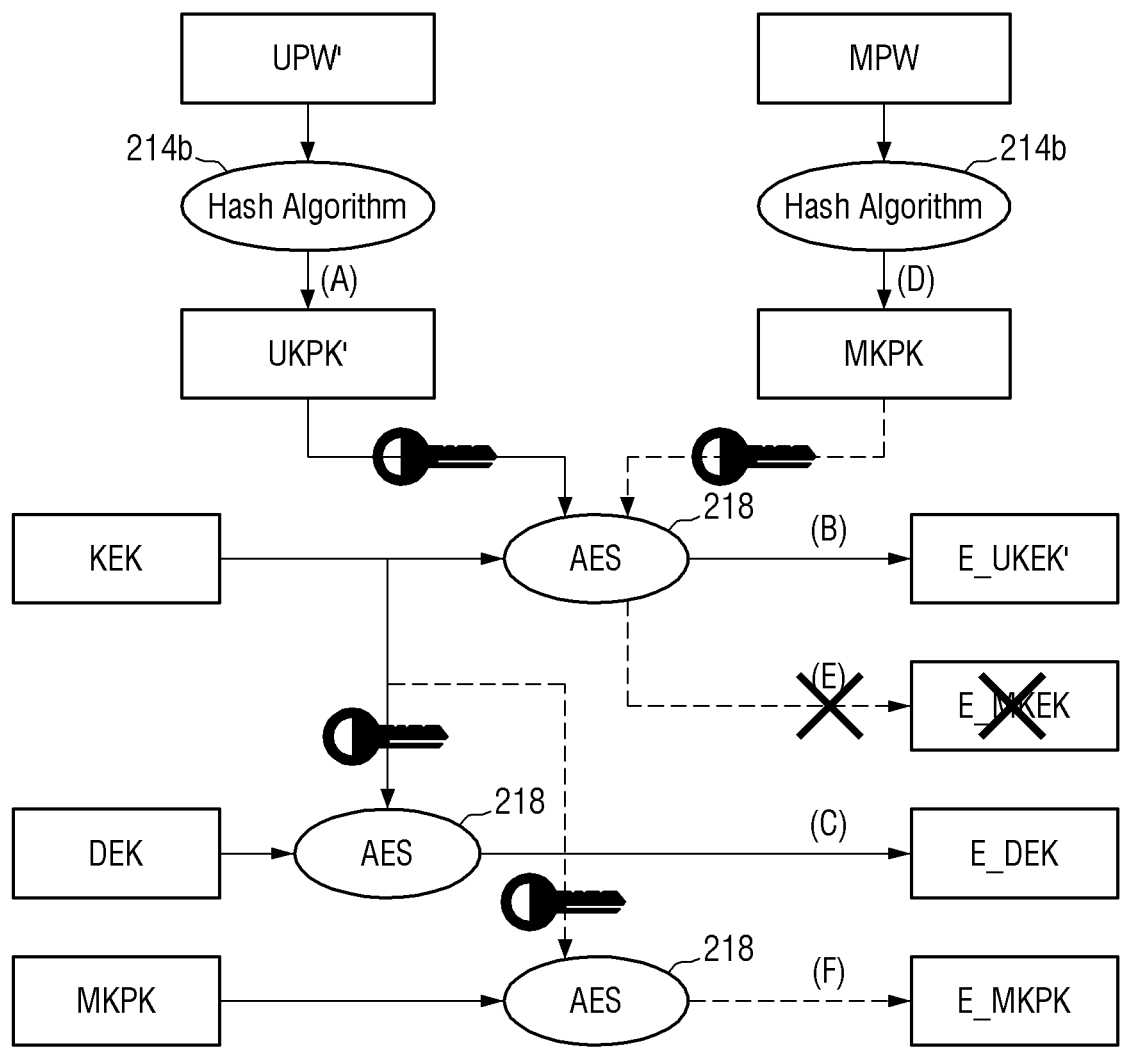

Referring to FIGS. 14 to 16, the storage device 200 according to some embodiments may receive provision of a security setting command CMD_3 that allows access to the data key DEK from the host 100, using the first password MPW (S310).

The security setting command CMD_3 may include the second password UPW' and the security authority of the second password UPW'. The security authority of the second password UPW may be the second level. Therefore, as mentioned above, access to the data key DEK may be blocked, using the first password MPW, and access to the data key DEK may be allowed, using the second password UPW'. Further, the security setting command CMD_3 may include an identification value indicating setting of the second password UPW.

In some embodiments, the security setting command CMD_3 may be implemented in the form of the SECURITY SET PASSWORD command shown in FIG. 15 in accordance with the ATA standard. Here, the first security level may be High, and the second security level may be Maximum. Since the detailed configuration of the SECURITY SET PASSWORD command is described in the ATA standard document, detailed description thereof will not be provided.

The storage controller 210 may generate a second encrypted encryption key E_UKEK' using the second key UKPK', and an encryption key KEK in response to the security setting command CMD_3, store the second encrypted encryption key E_UKEK' and the encryption key KEK in the meta area 222 of the non-volatile memory 220, and may delete the first encrypted encryption key E_MKEK stored in the meta area 222 of the non-volatile memory 220 (S320).

Figure 17:
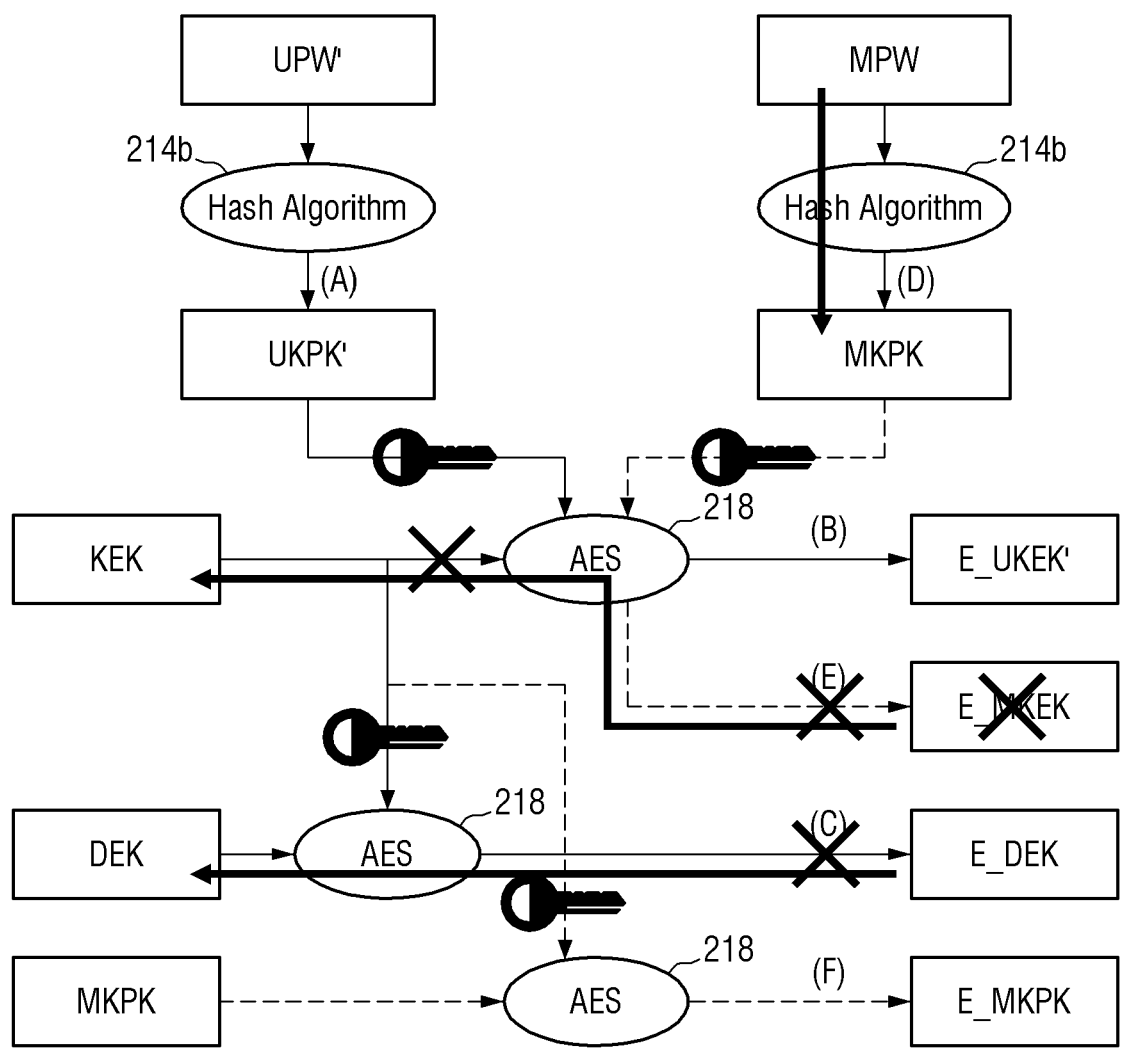

Therefore, referring to FIG. 17, the AES engine 218 may not generate the encryption key KEK using the first password MPW, and access to the data key DEK may be blocked using the first password MPW. The first password MPW is not changed.

Figure 18:
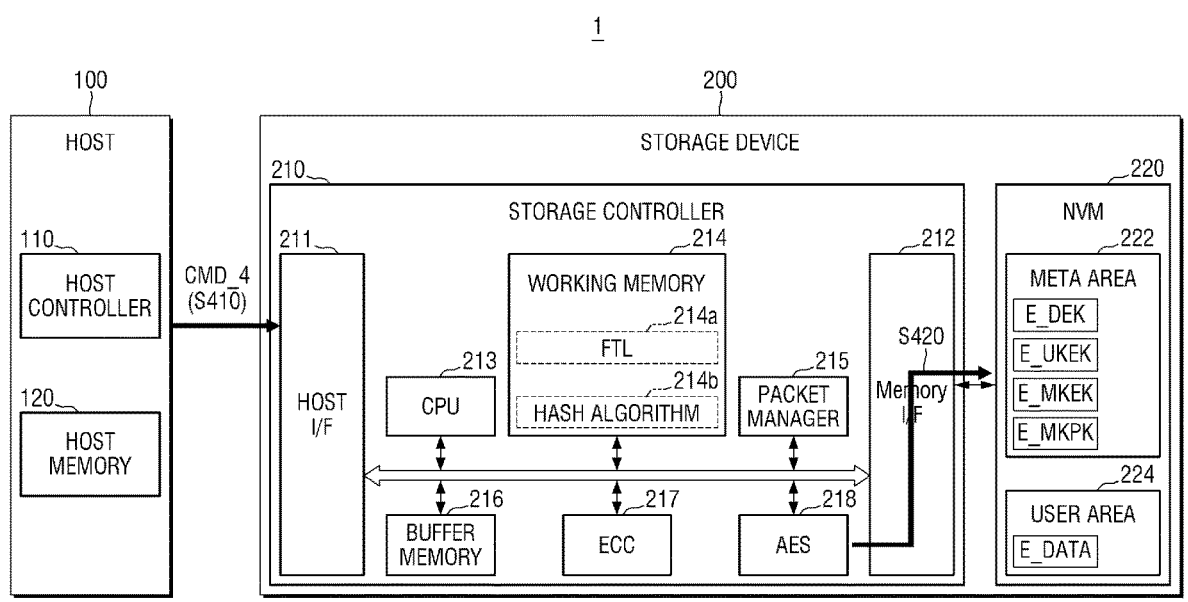
FIGS. 18 and 19 are diagrams for explaining the operation of the storage device according to some embodiments.
Figure 19:
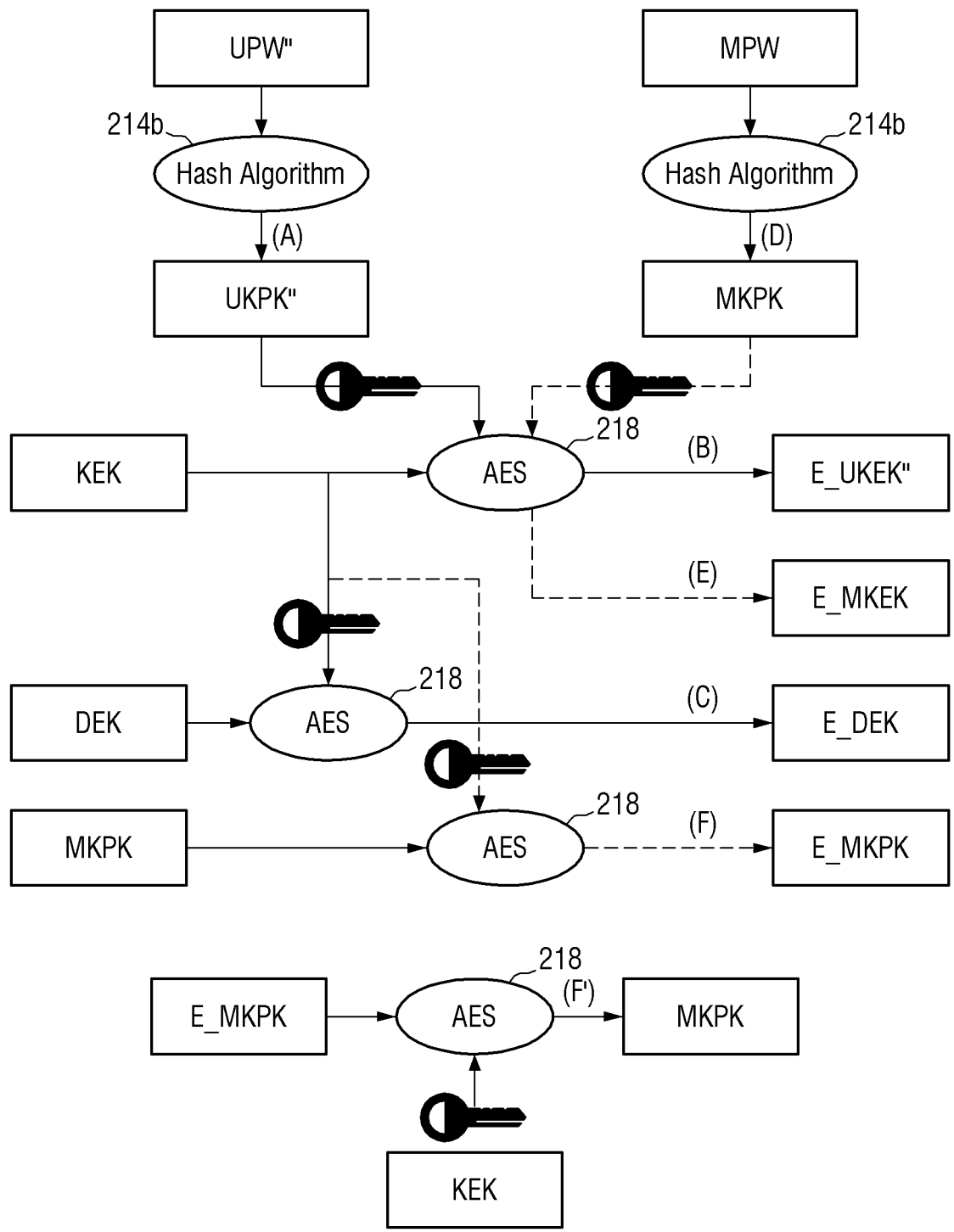

FIGS. 18 and 19 are diagrams for explaining the operation of the storage device according to some embodiments. FIGS. 18 and 19 are diagrams for explaining the operation of the storage device after steps S130 and S140 or steps S150 and S160 are performed after step S320 and the second encrypted encryption key E_UKEK' stored in the meta area 222 of the non-volatile memory 220 is deleted.

Referring to FIGS. 18 and 19, the storage device 200 according to some embodiments may receive provision of a security setting command CMD_4 that allows access to the data key DEK using the first password MPW (S410). The security setting command CMD_4 may include a second password UPW" and a security authority of the second password UPW". The security authority of the second password UPW" may be the first level. Therefore, as described above, access to the data key DEK may be allowed, using the first password MPW and the second password UPW".

The storage controller 210 may generate a second encrypted encryption key E_UKEK" using a second key UKPK" and an encryption key KEK, and may generate a first key MKPK and a first encrypted encryption key E_MKEK in response to the security setting command CMD_4, and may store the second encrypted encryption key E_UKEK" and the first encrypted encryption key E_MKEK in the meta area 222 of the non-volatile memory 220, and may delete the encryption key KEK stored in the meta area 222 of the non-volatile memory 220 (S420).

Specifically, referring to FIG. 19A, the hash algorithm 214b may generate a second key UKPK" on the basis of the second password UPW" (A). The second key UKPK" may be a hash value of the second password UPW". The AES engine 218 may encrypt the encryption key KEK with the second key UKPK" to generate a second encrypted encryption key E_UKEK" (B). The second encrypted encryption key E_UKEK" may be stored in the meta area 222 of the non-volatile memory 220. When the encryption key KEK is previously stored in the meta area 222 of the non-volatile memory 220, the storage controller 210 may delete the encryption key KEK and store the second encrypted encryption key E_UKEK". The access to the data key DEK may be allowed using the second password UPW" accordingly.

The AES engine 218 may decrypt the encrypted first key E_MKPK with the encryption key KEK to generate the second key MKPK (F'). The AES engine 218 may encrypt the second key MKPK with the encryption key KEK to generate an encrypted first key E_MKPK (F). Access to the data key DEK may be allowed using the first password MPW accordingly.

In the storage device according to some embodiments, the first key MKPK may be encrypted with the encryption key KEK, and the encryption key KEK may be encrypted with the first key MKPK. As a result, even when the state changes from the state in which access to the data key DEK is blocked in accordance with the security setting command to the state in which access to the data key DEK is allowed using the first password MPW, a password link between the encryption key KEK and the first key MKPK may be formed again.

Figure 20:
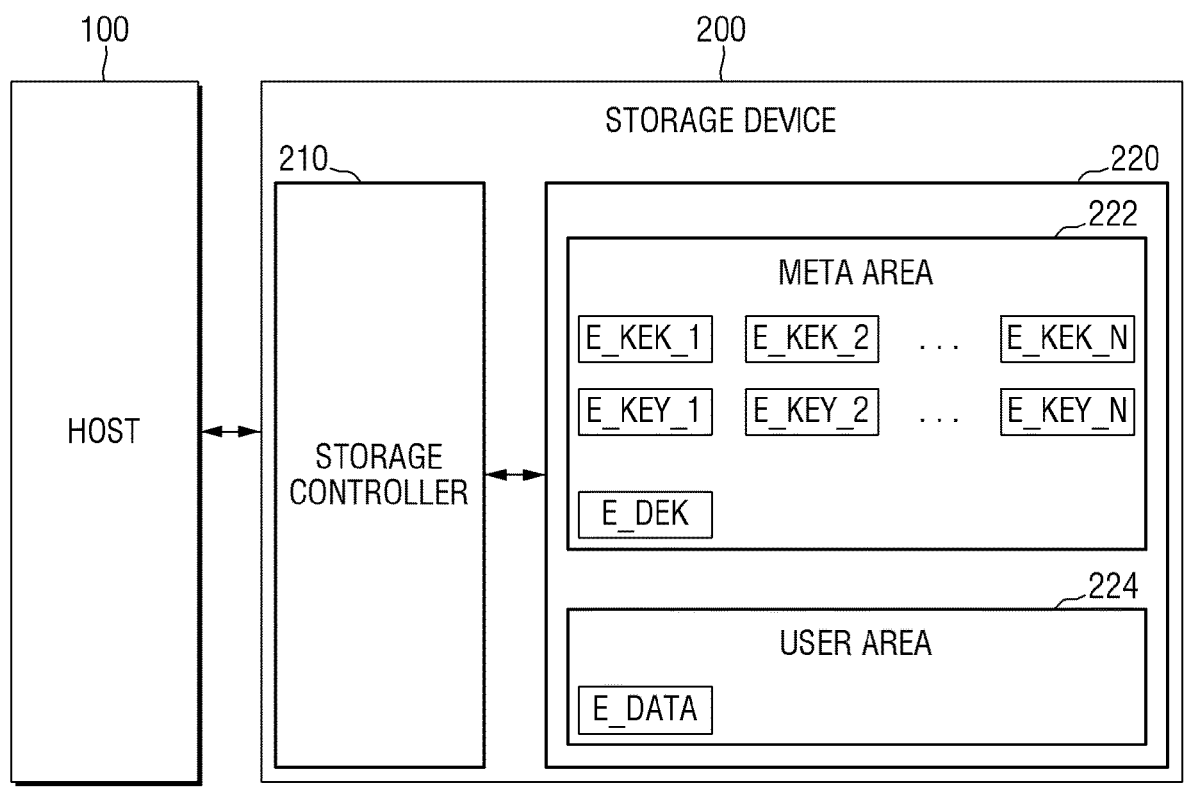
FIGS. 20 to 22 are diagrams for explaining a storage system according to some embodiments.
Figure 21A:
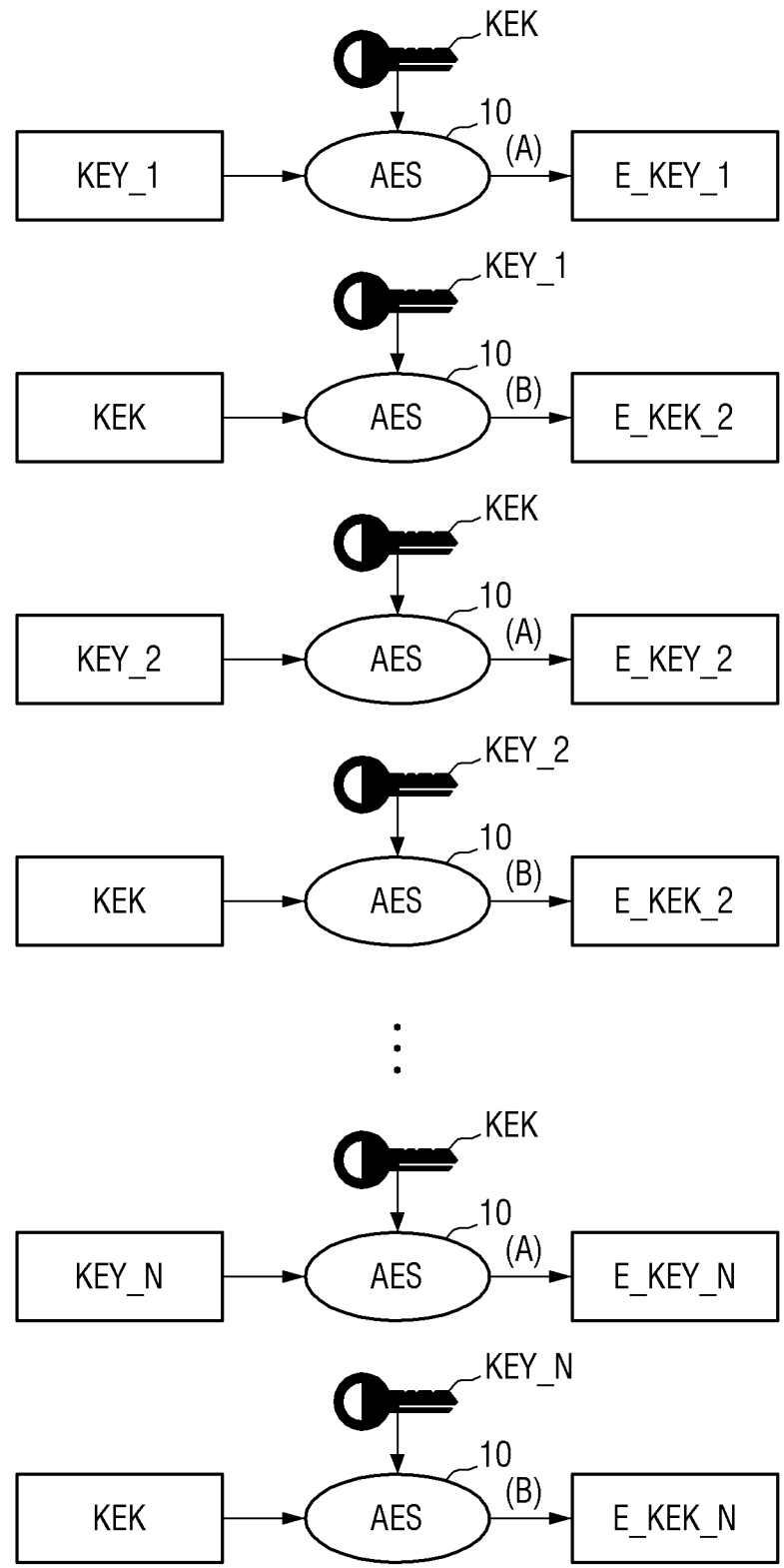
Figure 21B:
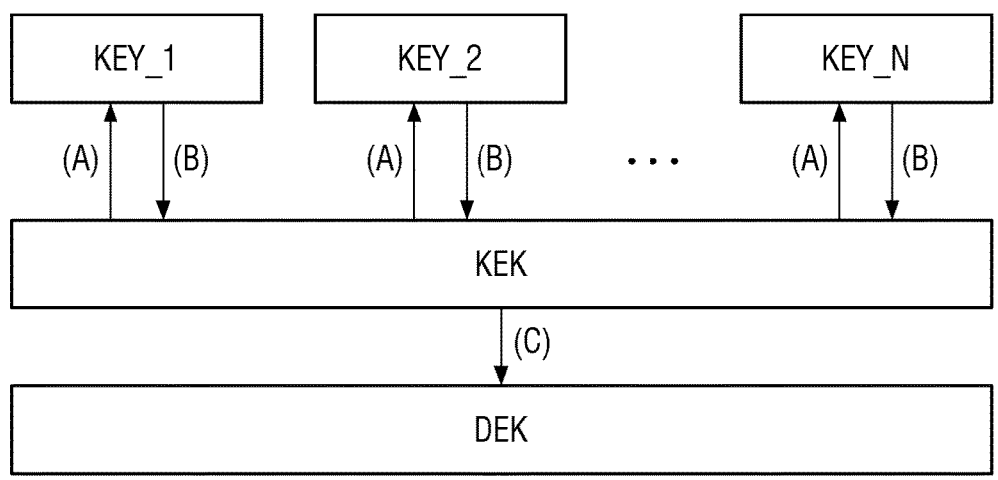
Figure 22:
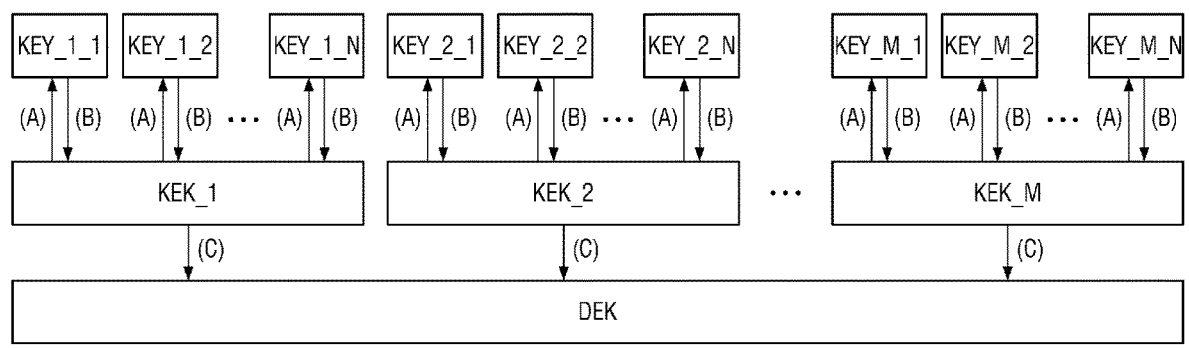

Further, since the storage device according to some embodiments stores the first key E_MKPK encrypted with the encryption key KEK, when the data key DEK or the encryption key KEK is updated, the password link between the updated data key DEK and the first password MPW may be maintained, using the encrypted first key E_MKPK. The security of the storage device 200 may be updated or improved accordingly FIGS. 20 to 22 are diagrams for explaining a storage system according to some embodiments. For convenience of explanation, points different from those described referring to FIGS. 1 to 19 will be mainly described.

Referring to FIGS. 20 and 21, in a storage system 2 according to some embodiments, the data key DEK may be accessed, using a plurality of first keys KEY_1 to KEY_N. Each particular key of the plurality of first keys KEY_1 to KEY_N may be described herein as a sub-key or individual key. For example, one first key may be referred to as a first sub-key or first individual key.

For each of the plurality of first keys KEY_1 to KEY_N, the storage controller 210 may encrypt the first keys KEY_1 to KEY_N with the encryption key KEK to generate encrypted first keys E_KEY_1 to E_KEY_N (A), and may encrypt the encryption key KEK with the first keys KEY_1 to KEY_N to generate first encrypted encryption keys E_KEK_1 to E_KEK_N (B), in response to the security setting command that allows access to the data key DEK using the first keys KEY_1 to KEY_N. Here, the encrypted data key E_DEK may be generated by encrypting the data key DEK with the encryption key KEK (C). The storage controller 210 may store the first encrypted encryption keys E_KEK_1 to E_KEK_N, the encrypted first keys E_KEY_1 to E_KEY_N, and the encrypted data key DEK in the meta area 222 of the non-volatile memory 220.

Each of the plurality of first keys KEY_1 to KEY_N may be generated from a plurality of first passwords. Each particular password of the plurality of first passwords may be described herein as a sub-password or individual password.

The storage controller 210 may delete the first encrypted encryption keys E_KEK_1 to E_KEK_N, in response to the security setting command that blocks access to the data key DEK, using the first keys KEY_1 to KEY_N, for each of the plurality of first keys KEY_1 to KEY_N.

The storage controller 210 may generate the encryption key KEK, using the encrypted first keys E_KEY_1 to E_KEY_N in response to the security setting command that allows access to the data key DEK, using each of the plurality of first keys KEY_1 to KEY_N, and may generate the first encrypted encryption keys E_KEK_1 to E_KEK_N again. Each particular first encrypted encryption key of keys E_KEK_1 to E_KEK_N may be described herein as a sub-key or individual key. For example, one first encrypted encryption key may be referred to as a second sub-key or second individual key. Each particular encrypted first key of keys E_KEY_1 to E_KEY_N may be described herein as a sub-key or individual key. For example, one encrypted first key may be referred to as a third sub-key or third individual key.

The storage device 200 may store the encrypted first keys E_KEY_1 to E_KEY_N in the storage system according to some embodiments. Accordingly, the storage device 200 may block access to the encryption key KEK from the first keys KEY_1 to KEY_N or allow the access again, in response to the security setting command that allows or blocks access to the data key DEK.

Referring to FIG. 22, the data key DEK may be encrypted with the plurality of encryption keys KEK_1 to KEK_M (C). Each of the plurality of encryption keys KEK_1 to KEK_M may be encrypted with a plurality of first keys KEY_1_1 to KEY_M_N (A), and may encrypt the plurality of first keys KEY_1_1 to KEY_M_N (B). Access to the plurality of encryption keys KEK_1 to KEK_M from the plurality of first keys KEY_1_1 to KEY_M_N may be blocked or allowed, in response to the security setting command that allows or blocks access to the data keys DEK.

The number of first keys KEY_1_1 to KEY_1_N that form the password link with each of the encryption keys KEK_1 to KEK_M may be the same as or different from each other. Further, although one data key DEK is shown in this drawing, the present disclosure is not limited thereto, and a plurality of data keys may be included. Each data key may form a password link with the plurality of encryption keys. Also, the number of plurality of encryption keys that form a password link with each data key may be the same as or different from each other.

Also, unlike the shown case, each of the first keys KEY_1_1 to KEY_M_N may form a password link with one encryption key KEK_1 to KEK_M or the plurality of encryption keys KEK_1 to KEK_M. For example, the first key KEY_1_1 may form a password link with the encryption key KEK_1, the first key KEY_1_2 may form a password link with the encryption keys KEK_1 and KEK_2, and the first key KEY_1_3 may form a password link with the encryption keys KEK_1, KEK_2, and KEK_4.

Figure 23:
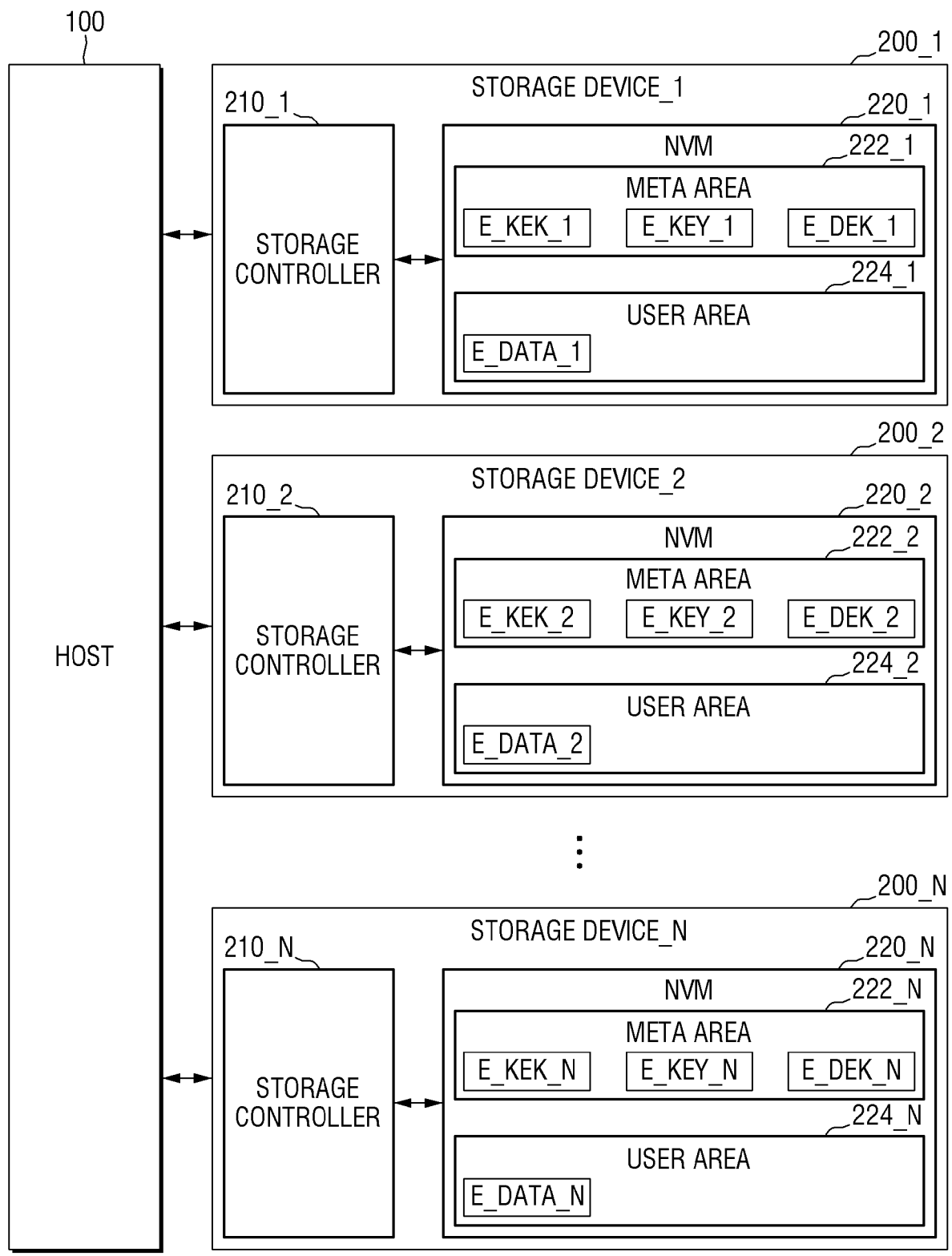
FIGS. 23 and 24 are diagrams for explaining the storage system according to some embodiments.
Figure 24:
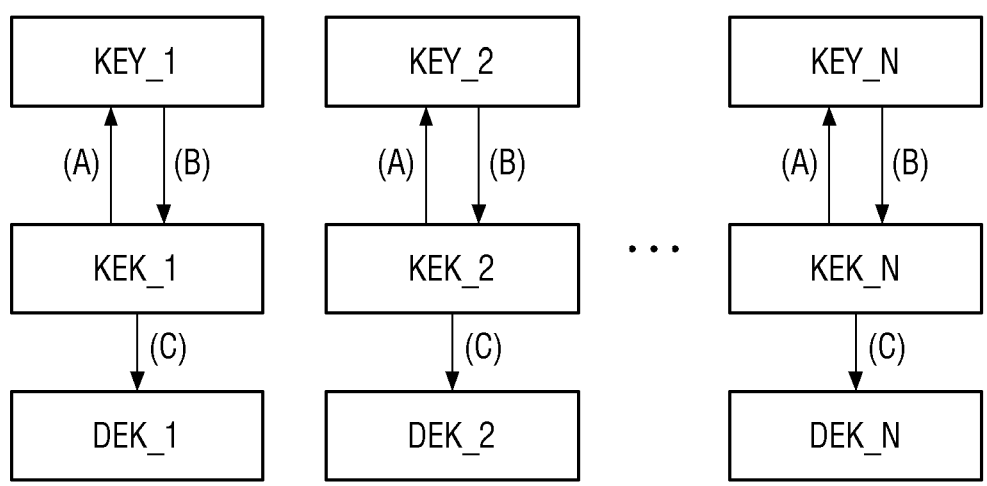

FIGS. 23 and 24 are diagrams for explaining the storage system according to some embodiments. For convenience of explanation, points different from those described referring to FIGS. 1 to 21 will be mainly described.

Referring to FIGS. 23 and 24, the storage system 3 according to some embodiments may include a plurality of storage devices 200_1 to 200_N.

The storage devices 200_1 to 200_N may include storage controllers 210_1 to 210_N, and non-volatile memories 220_1 to 220_N. The storage controllers 210_1 to 210_N may encrypt the first keys KEY_1 to KEY_N with the encryption keys KEK_1 to KEK_N to generate the encrypted first keys E_KEY_1 to E_KEY_N (A). The storage controllers 210_1 to 210_N may encrypt the encryption keys KEK_1 to KEK_N with the first keys KEY_1 to KEY_N to generate encrypted encryption keys E_KEK_1 to E_KEK_N (B). The storage controllers 210_1 to 210_N may encrypt the data keys DEK_1 to DEK_N with the encryption keys KEK_1 to KEK_N to generate encrypted data keys E_DEK_1 to E_DEK_N (C).

The meta areas 222_1 to 222 of the non-volatile memories 220_1 to 220_N may store the encrypted encryption keys E_KEK_1 to E_KEK_N, the encrypted first keys E_KEY_1 to E_KEY_N, and the encrypted data keys E_DEK_1 to E_DEK_N. Encrypted data E_DATA_1 to E_DATA_N may be stored in the data areas 222_1 to 222 of the non-volatile memories 220_1 to 220_N.

The storage devices 200_1 to 200_N may block the access to the encryption keys KEK_1 to KEK_N from the first keys KEY_1 to KEY_N or allow the access again in response to the security setting command that allows or blocks access to the data keys DEK_1 to DEK_N.

The numbers of encryption keys KEK_1 to KEK_N of the storage devices 200_1 to 200_N may be the same or different. Also, the numbers of first keys KEY_1 to KEY_N that form the password link with the encryption keys KEK_1 to KEK_N may differ from each other.

Figure 25:
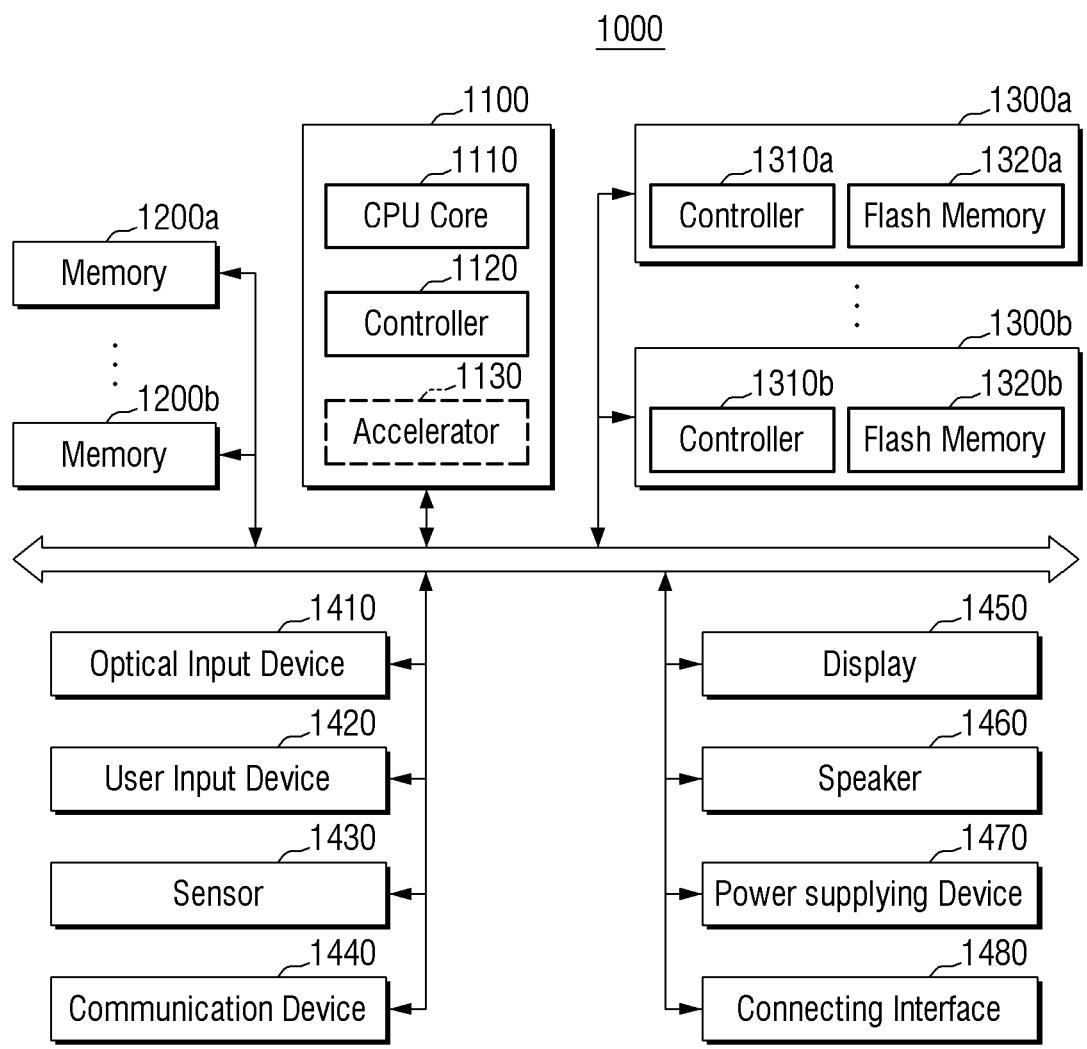
FIG. 25 is a diagram for explaining a system to which the storage device according to some embodiments is applied.

FIG. 25 is a diagram for explaining a system to which the storage device according to some embodiments is applied.

A system 1000 of FIG. 25 may be basically a mobile system, such as a mobile phone, a smart phone, a tablet PC (tablet personal computer), a wearable device, a healthcare device or an IOT (internet of things) device. However, the system 1000 of FIG. 25 is not necessarily limited to the mobile system, but may be a personal computer, a laptop computer, a server, a media player or an automotive device such as a navigation.

Referring to FIG. 25, the system 1000 may include a main processor 1100, memories 1200a and 1200b, and storage devices 1300a and 1300b, and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, more specifically, the operation of other components that make up the system 1000. Such a main processor 1100 may be implemented as a general purpose processor, a dedicated processor, an application processor, or the like.

The main processor 1100 may include one or more CPU cores 1110, and may further include a controller 1120 for controlling the memories 1200a and 1200b and/or storage devices 1300a and 1300b. Depending on the embodiments, the main processor 1100 may further include an accelerator block 1130, which is a dedicated circuit for high-speed data computation such as an AI (artificial intelligence) data computation. Such an accelerator block 1130 may include a GPU (Graphics Processing Unit), an NPU (Neural Processing Unit) and/or a DPU (Data Processing Unit), and may also be embodied as a separate chip that is physically independent from other components of the main processor 1100.

The memories 1200a and 1200b may be used as the main memory units of the system 1000, and may include a volatile memory such as a SRAM and/or a DRAM, but may also include a non-volatile memory such as a flash memory, a PRAM and/or a RRAM. The memories 1200a and 1200b may also be implemented in the same package as the main processor 1100.

The storage devices 1300a and 1300b may function as non-volatile storage devices for storing data regardless of power supply, and may have a relatively large capacity as compared with the memories 1200a and 1200b. The storage devices 1300a and 1300b may include the storage controllers 1310a and 1310b, and non-volatile memory (NVM) storage devices 1300a and 1300b that store data under the control of the storage controllers 1310a and 1310b. The non-volatile memories 1320a and 1320b may also include the same or different types of non-volatile memories.

The storage devices 1300a and 1300b may be included in the system 1000 in a state of being physically separated from the main processor 1100, and may be implemented in the same package as the main processor 1100.

The storage devices 1300a and 1300b may be one of the storage devices described referring to FIGS. 1 to 25.

The image capturing device 1410 may capture still images and moving images, and may be a camera, a camcorder and/or a webcam and the like.

The user input device 1420 may receive various types of data that are input from users of the system 1000, and may be a touch pad, a key pad, a keyboard, a mouse and/or a microphone.

The sensor 1430 may detect various types of physical quantities that may be acquired from the outside of the system 1000 and convert the detected physical quantities into electrical signals. Such a sensor 1430 may be a temperature sensor, a pressure sensor, an illuminance sensor, a position sensor, an acceleration sensor, a bio sensor and/or a gyroscope and the like.

The communication device 1440 may transmit and receive signals to and from other devices outside the system 1000 according to various communication protocols. Such a communication device 1440 may be implemented by including an antenna, a transceiver and/or a modem and the like.

The display 1450 and the speaker 1460 may function as output devices that output visual and auditory information to users of the system 1000, respectively.

The power supply device 1470 may appropriately convert the power supplied from a battery (not shown) built in the system 1000 and/or an external power supply, and supply the power to each component of the system 1000.

The connecting interface 1480 may provide a connection between the system 1000 and an external device that may be connected to the system 1000 to send and receive data to and from the system 1000. The connecting interface 1480 may be implemented by various interface ways such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), an NVMe (NVM express), an IEEE 1394, a USB (universal serial bus), a SD (secure digital) card, a MMC (multi-media card), an eMMC (embedded multi-media card), a UFS (universal Flash Storage), an eUFS (universal Flash Storage), and a CF (compact flash) card interface.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A storage device comprising:
a non-volatile memory configured to store an encryption key and a data key encrypted with the encryption key, write data using the data key, and read the data using the data key; and
a storage controller,
wherein the storage controller is configured to receive a first security setting command which allows access to the data key using a first password,
generate a first key on the basis of the first password in response to the first security setting command,
encrypt the encryption key with the first key to generate a first encrypted encryption key,
encrypt the first key with the encryption key to generate an encrypted first key, and
store the first encrypted encryption key and the encrypted first key in the non-volatile memory.

2. The storage device of claim 1, wherein the first key is a hash value of the first password.

3. The storage device of claim 1, wherein the storage controller is configured to delete the encryption key in response to the first security setting command.

4. The storage device of claim 1, wherein the storage controller is configured to:
receive a second security setting command which blocks access to the data key using the first password, and
delete the first encrypted encryption key stored in the non-volatile memory in response to the second security setting command.

5. The storage device of claim 4, wherein the storage controller is configured to:
receive a third security setting command that allows access to the data key using the first password,
decrypt the encrypted first key stored in the non-volatile memory to generate the first key in response to the third security setting command,
encrypt the encryption key with the first key to generate the first encrypted encryption key, and
store the first encrypted encryption key in the non-volatile memory.

6. The storage device of claim 1, wherein the first password is not changed by the first security setting command.

7. The storage device of claim 1, wherein:
the first security setting command includes a second password different from the first password, and allows access to the data key further using the second password, and
the storage controller is configured to:
generate a second key on the basis of the second password in response to the first security setting command,
encrypt the encryption key with the second key to generate a second encrypted encryption key, and
store the second encrypted encryption key in the non-volatile memory.

8. The storage device of claim 7, wherein the storage controller is configured to delete the encryption key stored in the non-volatile memory in response to the first security setting command.

9. The storage device of claim 7, wherein the second key is a hash value of the second password.

10. The storage device of claim 7, wherein the storage controller is configured to:
receive a security release command that allows access to the data key without using the first password or the second password, and
delete the first encrypted encryption key and the second encrypted encryption key stored in the non-volatile memory in response to the security release command.

11. The storage device of claim 10, wherein the storage controller is configured to:
delete the encryption key stored in the non-volatile memory in response to the first security setting command, and
store the encryption key in the non-volatile memory in response to the security release command.

12. The storage device of claim 7, wherein the storage controller is configured to:
receive a security deletion command which includes one of the first password and the second password and deletes the data stored in the non-volatile memory, and
delete the data stored in the non-volatile memory, the first encrypted encryption key, the second encrypted encryption key, and encrypted data key, in response to the security deletion command.

13. The storage device of claim 12, wherein the storage controller is configured to:
generate a new data key in response to the security deletion command,
encrypt the new data key with the encryption key, and
store the new data key in the non-volatile memory.

14. A storage device comprising:
a non-volatile memory configured to store an encrypted first key generated by encrypting a first key generated on the basis of a first password with an encryption key, a first encrypted encryption key generated by encrypting the encryption key with the first key, and an encrypted data key generated by encrypting the data key with the encryption key; and
a storage controller configured to control an operation of the non-volatile memory,
wherein the storage controller is configured to:
receive a first security setting command which blocks access to the data key using the first password,
delete the first encrypted encryption key stored in the non-volatile memory in response to the first security setting command,
receive a second security setting command which allows access to the data key using the first password, and
store the first encrypted encryption key in the non-volatile memory in response to the second security setting command.

15. The storage device of claim 14, wherein the storage controller is configured to:
decrypt the encrypted first key stored in the non-volatile memory to generate the first key, in response to the second security setting command,
encrypt the encryption key with the first key to generate the first encrypted encryption key, and
store the first encrypted encryption key in the non-volatile memory.

16. The storage device of claim 14, wherein the non-volatile memory includes:
a user area in which data is written using the data key and the data is read using the data key, and
a meta area in which the encryption key, the first encrypted encryption key, and the encrypted first key are stored.

17. The storage device of claim 14, wherein:
the first security setting command includes a second password different from the first password, and allows access to the data key using the second password,
the second security setting command includes a third password different from the first password, and allows access the data key further using the third password, and
the storage controller is configured to:
generate a second key on the basis of the second password in response to the first security setting command,
encrypt the encryption key with the second key to further generate a second encrypted encryption key,
store the second encrypted encryption key in the non-volatile memory,
generate a third key on the basis of the third password in response to the second security setting command,
encrypt the encryption key with the third key to further generate a third encrypted encryption key, and
store the third encrypted encryption key in the non-volatile memory.

18. A storage device comprising:
a non-volatile memory configured to store a first encryption key and a first encrypted data key encrypted with the first encryption key, write data using the data key, and read the data using the data key; and
a storage controller,
wherein the storage controller is configured to:
receive a first security setting command that allows access to the data key, using a plurality of first passwords different from each other,
generate a plurality of first keys on the basis of each of the plurality of first passwords in response to the first security setting command,
encrypt the first encryption key with each of the plurality of first keys to generate a plurality of first encrypted encryption keys,
encrypt each of the plurality of first keys with the first encryption key to generate a plurality of encrypted first keys, and
store the plurality of first encrypted encryption keys and the plurality of encrypted first keys in the non-volatile memory.

19. The storage device of claim 18, wherein:
the plurality of first passwords include a first sub-password,
the plurality of first keys include a first sub-key generated on the basis of the first sub-password,
the plurality of first encrypted encryption keys include a second sub-key generated by encrypting the first encryption key with the first sub-key, and
the storage controller is configured to:
receive a second security setting command which blocks access to the data key using the first sub-password, and
delete the second sub-key in response to the second security setting command.

20. The storage device of claim 18, wherein:
the non-volatile memory is further configured to store a second encryption key different from the first encryption key, and a second encrypted data key encrypted with the second encryption key, and
the storage controller is configured to:
receive a second security setting command that allows access to the data key, using a plurality of second passwords different from each other, generate a plurality of second keys on the basis of each of the plurality of second passwords in response to the second security setting command, encrypt the second encryption key with each of the plurality of second keys to generate a plurality of second encrypted encryption keys, encrypt each of the plurality of second keys with the second encryption key to generate a plurality of encrypted second keys, and store the plurality of second encrypted encryption keys and the plurality of encrypted second keys in the non-volatile memory.

\* \* \* \* \*